(12) United States Patent
Yu et al.

(10) Patent No.: US 8,482,686 B2
(45) Date of Patent: Jul. 9, 2013

(54) DISPLAYS WITH MINIMIZED CROSSTALK

(71) Applicant: Apple Inc., Cupertino, CA (US)

(72) Inventors: Cheng Ho Yu, Cupertino, CA (US);
Ming Xu, Sunnyvale, CA (US); Young
Bae Park, San Jose, CA (US); Zhibing
Ge, Sunnyvale, CA (US); Daisuke
Nozu, Kita (JP); Cheng Chen, San Jose,
CA (US); Abbas Jamshidi Roudbari,
Sunnyvale, CA (US); Shih Chang
Chang, Cupertino, CA (US); Shawn R.
Gettemy, San Jose, CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 13/762,276

(22) Filed: Feb. 7, 2013

(65) Prior Publication Data
US 2013/0147774 A1 Jun. 13, 2013

Related U.S. Application Data

(62) Division of application No. 12/975,284, filed on Dec.
21, 2010, now Pat. No. 8,395,715.

(51) Int. Cl.
*G02F 1/141* (2006.01)
*G02F 1/133* (2006.01)
*G09G 5/00* (2006.01)
(52) U.S. Cl.
USPC ............... 349/37; 349/33; 349/34; 345/206;
345/214

(58) Field of Classification Search
USPC ................. 349/37, 33, 34; 345/206, 214
See application file for complete search history.

(56) References Cited

U.S. PATENT DOCUMENTS

| 5,790,092 | A | * | 8/1998 | Moriyama | 345/96 |
| 6,211,851 | B1 | * | 4/2001 | Lien et al. | 345/89 |
| 8,077,130 | B2 | * | 12/2011 | Pai et al. | 345/96 |
| 8,223,284 | B2 | | 7/2012 | Sugisaka et al. | |
| 2008/0013009 | A1 | | 1/2008 | Inada | |

FOREIGN PATENT DOCUMENTS

| EP | 2078979 | 7/2009 |
| KR | 482458 | 8/2005 |
| KR | 2006001331 | 1/2006 |

* cited by examiner

*Primary Examiner* — Mike Qi
(74) *Attorney, Agent, or Firm* — Treyz Law Group; G. Victor
Treyz; David C. Kellogg

(57) ABSTRACT

Display ground plane structures may contain slits. Image pixel electrodes in the display may be arranged in rows and columns. Image pixels in the display may be controlled using gate lines that are associated with the rows and data lines that are associated with the columns. An electric field may be produced by each image pixel electrode that extends through a liquid crystal layer to an associated portion of the ground plane. The slits in the ground plane may have a slit width. Data lines may be located sufficiently below the ground plane and sufficiently out of alignment with the slits to minimize crosstalk from parasitic electric fields. A three-column inversion scheme may be used when driving data line signals into the display, so that pairs of pixels that straddle the slits are each driven with a common polarity. Gate line scanning patterns may be used that enhance display uniformity.

20 Claims, 29 Drawing Sheets

| | A3 | B1 | B2 | B3 | A1 | A2 |
|---|---|---|---|---|---|---|
| P1 | VD-DL=<br>-2.5V-2.5V<br>=0V | VD-DL=<br>2.5V-2.5V<br>=0V | VD-DL=<br>2.5V-5V<br>=-2.5V | VD-DL=<br>2.5V-2.5V<br>=0V | VD-DL=<br>-2.5V-2.5V<br>=0V | VD-DL=<br>-2.5V-5V<br>=-2.5V |
| P1' | VD-DL=<br>-2.5V-2.5V<br>=0V | VD-DL=<br>-2.5V-2.5V<br>=-5V | VD-DL=<br>-2.5V-5V<br>=-7.5V | VD-DL=<br>-2.5V-2.5V<br>=0V | VD-DL=<br>2.5V-2.5V<br>=5V | VD-DL=<br>-2.5V-5V<br>=-7.5V |

FIG. 14

| | A3 | B1 | B2 | B3 | A1 | A2 |
|---|---|---|---|---|---|---|
| PØ | VD-DL= -2.5V-2.5V =0V | VD-DL= 2.5V-2.5V =0V | VD-DL= 2.5V-2.5V =0V | VD-DL= 2.5V-2.5V =0V | VD-DL= -2.5V-2.5V =0V | VD-DL= -2.5V-2.5V =0V |
| PØ' | VD-DL= -2.5V-2.5V =0V | VD-DL= -2.5V-2.5V =-5V | VD-DL= -2.5V-2.5V =-5V | VD-DL= 2.5V-2.5V =0V | VD-DL= 2.5V-2.5V =5V | VD-DL= 2.5V-2.5V =5V |

FIG. 15

DISPLAYS WITH MINIMIZED CROSSTALK

This application is a division of patent application Ser. No. 12/975,284, filed Dec. 21, 2010, which is hereby incorporated by referenced herein in its entirety. This application claims the benefit of and claims priority to patent application Ser. No. 12/975,284, filed Dec. 21, 2010.

BACKGROUND

This relates generally to displays, and, more particularly, to displays such as liquid crystal displays.

Displays are widely used in electronic devices to display images. Displays such as liquid crystal displays display images by controlling liquid crystal material associated with an array of image pixels. A typical liquid crystal display has a color filter layer and a thin film transistor layer formed between polarizer layers. The color filter layer has an array of pixels each of which includes color filter elements of different colors. The thin film transistor layer contains an array of thin film transistor circuits. The thin film transistor circuits can be adjusted to control the amount and color of light that is produced by each pixel. Thin film transistor circuitry in a typical pixel array includes data lines and gate lines for distributing data and control signals.

A layer of liquid crystal material is interposed between the color filter layer and the thin film transistor layer. During operation, the circuitry of the thin film transistor layer applies signals to an array of electrodes in the thin film transistor layer in response to data and gate line signals. This produces electric fields that extend from each electrode through the liquid crystal layer to an associated portion of a ground plane. The electric fields control the orientation of liquid crystal material in the liquid crystal layer and change how the liquid crystal material affects polarized light.

In some situations, it may be desirable to incorporate form slits within the ground plane of a display. Slits may be used, for example, to define patterns of ground plane conductor material for use in forming touch sensor structures.

Care must be taken, however, in creating ground plane slits. If the slits and other structures in a display are not configured properly, the display may exhibit undesired crosstalk, may exhibit poor color uniformity, or may otherwise be adversely affected.

It would therefore be desirable to be able to provide improved displays such as displays that exhibit minimized crosstalk and enhanced color uniformity.

SUMMARY

Displays such as liquid crystal displays may be provided that include ground plane structures with slits. A display may include rows and columns of image pixel electrodes. Image pixels in the display may be controlled using gate lines that are associated with the rows and data lines that are associated with the columns. An electric field may be produced by each image pixel electrode that extends through a liquid crystal layer to an associated portion of the ground plane.

Data lines may be located sufficiently below the ground plane and sufficiently out of alignment with the slits to minimize parasitic electric fields.

Display driver circuitry in the display may drive the data lines using a polarity pattern that promotes color uniformity. With one suitable arrangement, a three-column inversion scheme can be used to drive data line signals into the display. In a given row of the display, pixels are generally associated with different colors. Pairs of the pixels are located on opposing edges of slits that are interposed among the pixels in the row. The three-column inversion scheme ensures that both of the pixels in each pair of slit-straddling pixels are supplied with data line signals of the same polarity. This may minimize the production of parasitic electric fields between data lines and pixel electrodes and may help promote display uniformity.

Gate line scanning patterns may be used that enhance display uniformity. The gate line scanning patterns may include patterns in which even and odd gate lines are scanned in opposite directions. Gate line scanning patterns may also be used in which gate lines are scanned using an odd and even gate line scanning pattern that extends over a sequence of four consecutive frames.

Further features of the invention, its nature and various advantages will be more apparent from the accompanying drawings and the following detailed description of the preferred embodiments.

BRIEF DESCRIPTION OF THE DRAWINGS

FIGS. 14 and 15 are tables of the respective location-dependent data line and electrode voltages of FIGS. 12 and 13 that are indicative of the strength of parasitic field lines of the type shown in FIG. 8 in a display in accordance with an embodiment of the present invention.

DETAILED DESCRIPTION

Displays are widely used in electronic devices. For example, displays may be used in computer monitors, laptop computers, media players, cellular telephones and other handheld devices, tablet computers, televisions, and other equipment. Displays may be based on plasma technology, organic-light-emitting-diode technology, liquid crystal structures, etc.

Liquid crystal displays are popular because they can exhibit low power consumption and good image quality. Liquid crystal display structures are sometimes described herein as an example.

Figure 1:
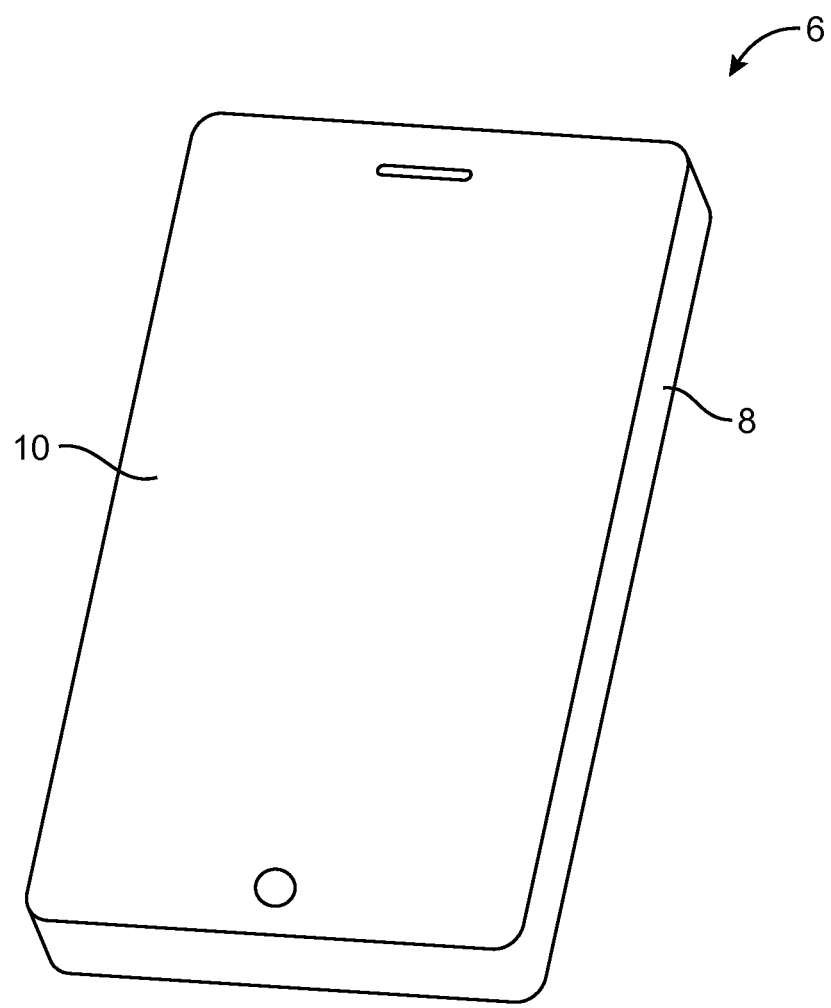
FIG. 1 is a cross-sectional side view of an illustrative display such as a liquid crystal display of the type that may be provided with structures to reduce crosstalk and ensure display uniformity in accordance with an embodiment of the present invention.

A perspective view of an illustrative electronic device with a display is shown in FIG. 1. As shown in FIG. 1, electronic device 6 may have a housing such as housing 8. Housing 8 may be formed from materials such as plastic, glass, ceramic, metal, fiber composites, and combinations of these materials. Housing 8 may have one or more sections. For example, device 6 may be provided with a display housing portion and a base housing portion that are coupled by hinges. In the arrangement of FIG. 1, device 6 has a front face and a rear face. Display 10 of FIG. 1 is mounted on the front face of housing 8. Other configurations may be used if desired.

Display 10 may be a liquid crystal display. A touch sensor array may be incorporated into display 10 (e.g., to form a touch screen display). The touch sensor may be based on acoustic touch technology, force sensor technology, resistive sensor technology, or other suitable types of touch sensor. With one suitable arrangement, the touch sensor portion of display 10 may be formed using a capacitive touch sensor arrangement. With this type of configuration, display 10 may include a touch sensor array that is formed from rows and columns of capacitive touch sensor electrodes.

Figure 2:
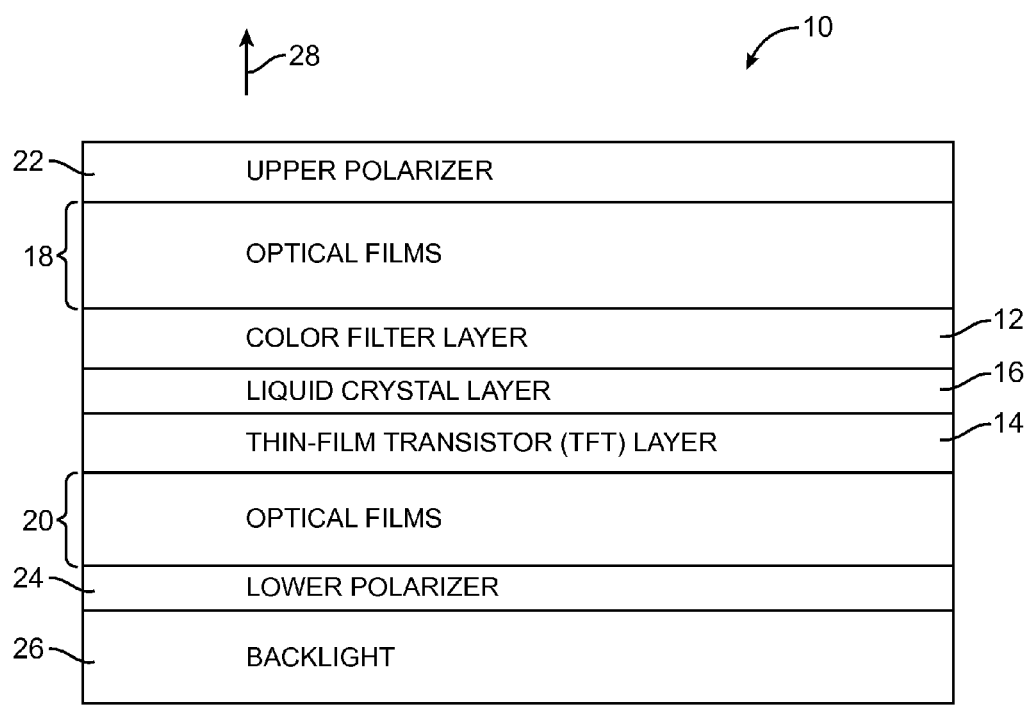
FIG. 2 is cross-sectional side view of a display in accordance with an embodiment of the present invention.

A cross-sectional side view of a portion of a display of the type that may be used in forming display 10 of FIG. 1 is shown in FIG. 2. As shown in FIG. 2, display 10 may include color filter (CF) layer 12 and thin-film-transistor (TFT) layer 14. Color filter layer 12 may include an array of colored filter elements. In a typical arrangement, the pixels of layer 12 each include three types of colored pixels (e.g., red, green, and blue subpixels). Liquid crystal (LC) layer 16 includes liquid crystal material and is interposed between color filter layer 12 and thin-film-transistor layer 14. Thin-film-transistor layer 14 may include electrical components such as thin film transistors, capacitors, and electrodes for controlling the electric fields that are applied to liquid crystal layer 16.

Optical film layers 18 and 20 may be formed above and below color filter layer 12, liquid crystal layer 16, and thin-film-transistor layer 14. Optical films 18 and 20 may include structures such as quarter-wave plates, half-wave plates, diffusing films, optical adhesives, and birefringent compensating layers.

Display 10 may have upper and lower polarizer layers 22 and 24. Backlight 26 may provide backside illumination for display 10. Backlight 26 may include a light source such as a strip of light-emitting diodes. Backlight 26 may also include a light-guide plate and a back reflector. The back reflector may be located on the lower surface of the light-guide panel to prevent light leakage. Light from the light source may be injected into an edge of the light-guide panel and may scatter upwards in direction 28 through display 10. An optional cover layer such as a layer of coverglass may be used to cover and protect the layers of display 10 that are shown in FIG. 2.

Touch sensor structures may be incorporated into one or more of the layers of display 10. In a typical touch sensor configuration, an array of capacitive touch sensor electrodes may be implemented using pads and/or strips of a transparent conductive material such as indium tin oxide. Other touch technologies may be used if desired (e.g., resistive touch, acoustic touch, optical touch, etc.). Indium tin oxide or other transparent conductive materials or non-transparent conductors may also be used in forming signal lines in display 10 (e.g., structures for conveying data, power, control signals, etc.).

In black and white displays, color filter layer 12 can be omitted. In color displays, color filter layer 12 can be used to impart colors to an array of image pixels. Each image pixel may, for example, have three corresponding liquid crystal diode subpixels. Each subpixel may be associated with a separate color filter element in the color filter array. The color filter elements may, for example, include red (R) color filter elements, blue (B) color filter elements, and green (G) color filter elements. These elements may be arranged in rows and columns. For example, color filter elements can be arranged in stripes across the width of display 10 (e.g., in a repeating patterns such as a RBG pattern or BRG pattern) so that the color filter elements in each column are the same (i.e., so that each column contains all red elements, all blue elements, or all green elements). By controlling the amount of light transmission through each subpixel, a desired colored image can be displayed.

The amount of light transmitted through each subpixel can be controlled using display control circuitry and electrodes. Each subpixel may, for example, be provided with a transparent indium tin oxide electrode. The signal on the subpixel electrode, which controls the electric field through an associated portion of the liquid crystal layer and thereby controls the light transmission for the subpixel, may be applied using a thin film transistor. The thin film transistor may receive data signals from data lines and, when turned on by an associated gate line, may apply the data line signals to the electrode that is associated with that thin-film transistor.

Figure 3:
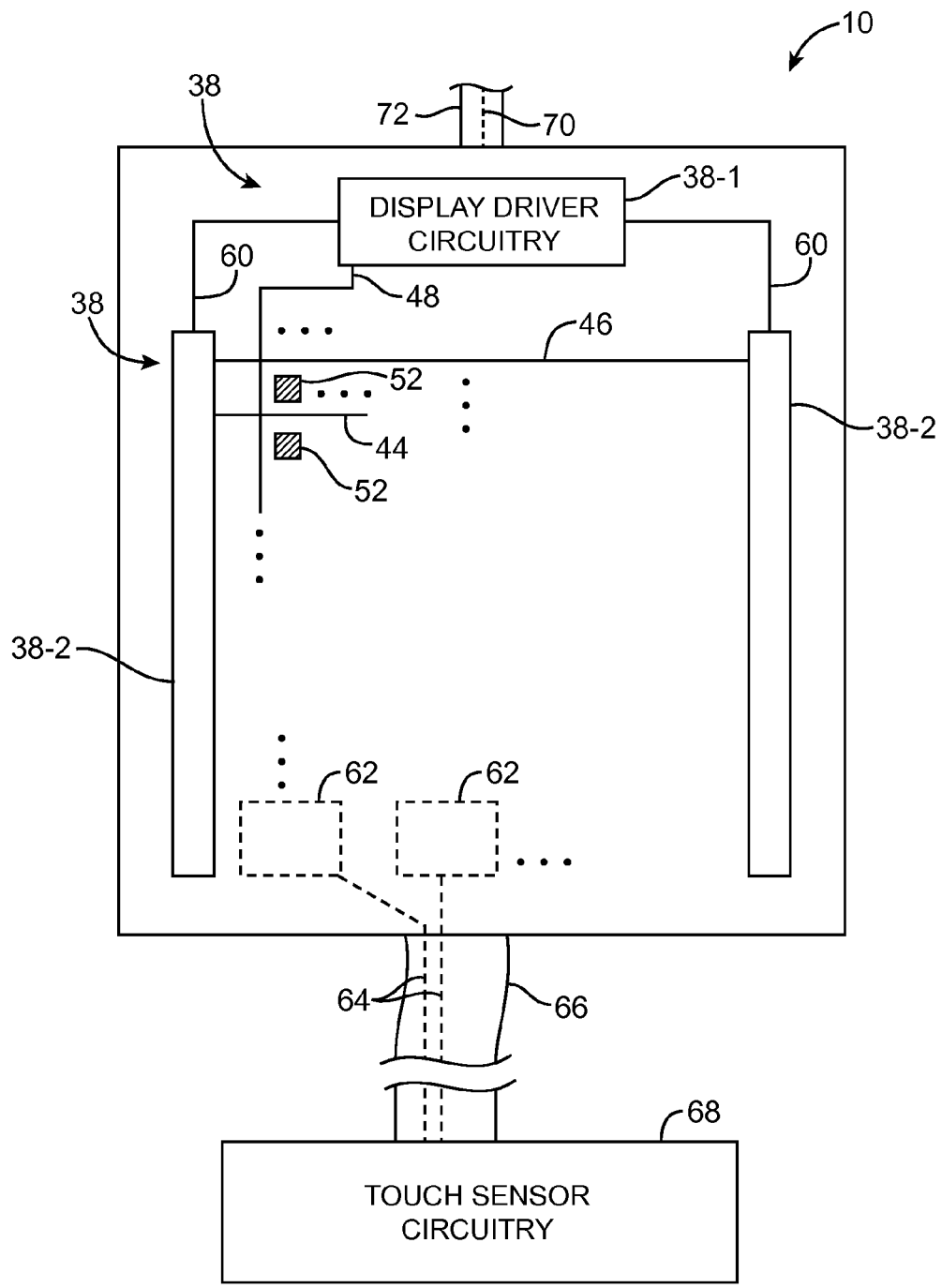
FIG. 3 is a diagram showing how a display may be provided with image pixel structures and touch sensor elements in accordance with an embodiment of the present invention.

A top view of an illustrative display is shown in FIG. 3. As shown in FIG. 3, display 10 may include an array of image pixels 52. Each image pixel may have an electrode that receives a data line signal from an associated transistor and a ground electrode. The ground electrodes of display 10 may be formed from a layer of patterned of indium tin oxide or other conductive planar structures. The patterned indium tin oxide structure or other conductive structures that are used in forming the ground plane for image pixels 52 may also be used in forming capacitive touch sensor elements 62.

As illustrated by touch sensor elements 62 of FIG. 3, touch sensor elements (electrodes) may be coupled to touch sensor circuitry 68. Touch sensor elements 62 may include rectangular pads of conductive material, vertical and/or horizontal strips of conductive material, and other conductive structures. Signals from elements 62 may be routed to touch sensor processing circuitry 68 via traces 64 on flex circuit cable 66 or other suitable communications path lines.

In a typical arrangement, there are fewer capacitor electrodes 62 in display 10 than there are image pixels 52, due to the general desire to provide more image resolution than touch sensor resolution. For example, there may be hundreds or thousands of rows and/or columns of pixels 52 in display 10 and only tens or hundreds of rows and/or columns of capacitor electrodes 62.

Display 10 may include display driver circuitry 38. Display driver circuitry 38 may receive image data from processing circuitry in device 6 using conductive lines 70 in path 72. Path 72 may be, for example, a flex circuit cable or other communications path that couples display driver circuitry 38 to integrated circuits on a printed circuit board elsewhere in device 6 (as an example).

Display driver circuitry 38 may include circuitry 38-1 and circuitry 38-2. Circuitry 38-1 may be implemented using one or more integrated circuits (e.g., one or more display driver integrated circuits). Circuitry 38-2 (sometimes referred to as gate line and Vcom driver circuitry) may be incorporated into circuitry 38-1 or may be implemented using thin film transistors on layer 14 (FIG. 2). Paths such as paths 60 may be used to interconnect display driver circuitry 38-1 and 38-2. Display driver circuitry 38 may also be implemented using external circuits or other combinations of circuitry, if desired.

Display driver circuitry 38 may control the operation of display 10 using a grid of signal lines such as data lines 48, gate lines 46, and Vcom lines (paths) 44. Lines 48, 46, and 44 may form conductive paths for signals that control an array of image subpixels such as subpixels 52 in display 10. Subpixels 52 (which are sometimes referred to as pixels) may each be formed from electrodes that give rise to an electric field and a portion of liquid crystal layer 16 (FIG. 2) that is controlled by that electric field.

Figure 4:
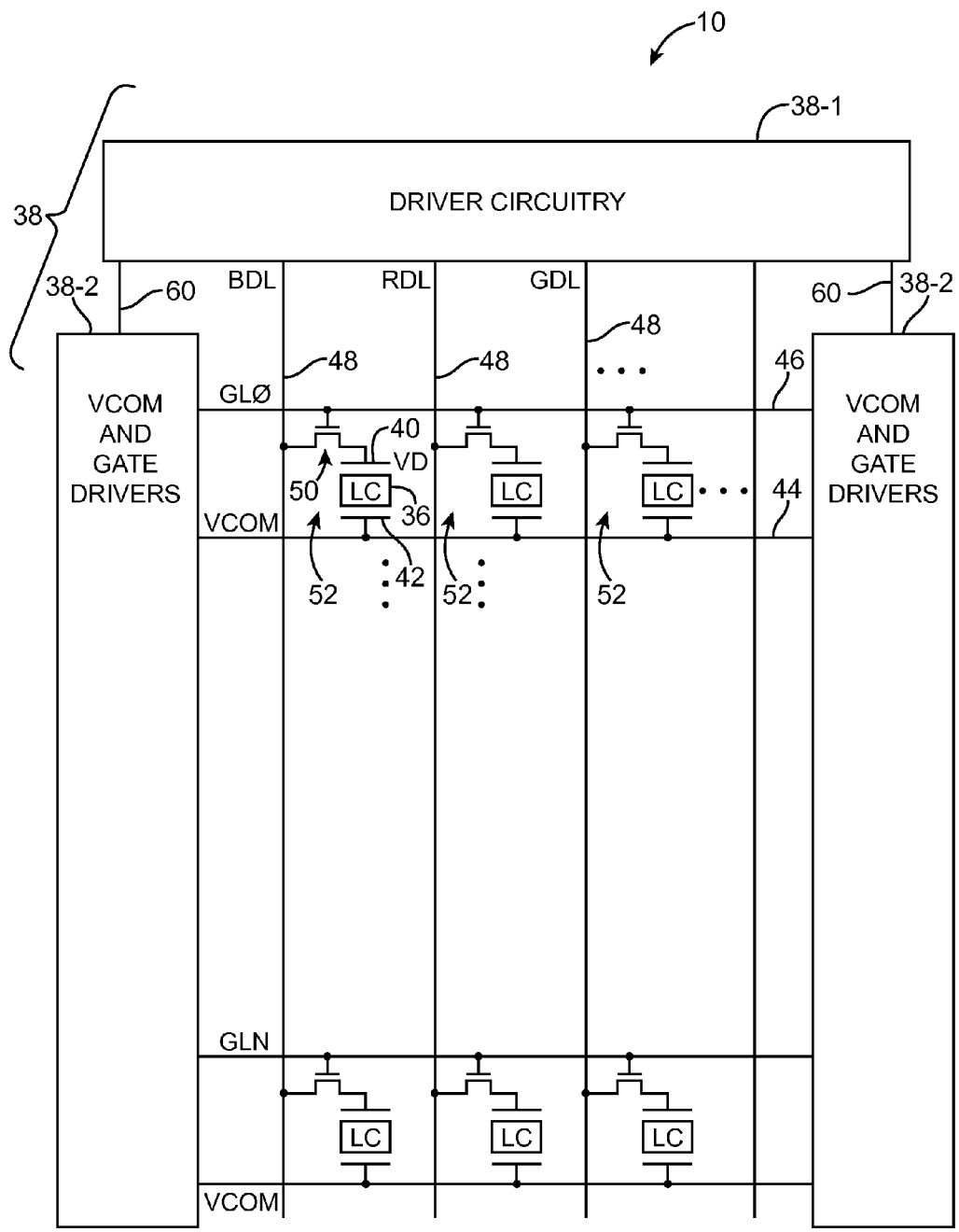
FIG. 4 is a circuit diagram of an illustrative display having rows and columns of image pixels in accordance with an embodiment of the present invention.

As shown in FIG. 4, pixels 52 in display 10 may each be associated with a portion such as portion 36 of liquid crystal layer 16 of FIG. 2. By controlling transmission through pixels 52, images may be displayed on display 10.

Data lines 48 may include lines for addressing pixels of different colors (i.e., pixels associated with color filter elements of different colors). For example, data lines 48 may include blue data lines that carry blue data line signals BDL, red data lines that carry red data line signals RDL, and green data lines that carry green data line signals GDL. Signals BDL, RDL, and GDL may be analog signals having voltages ranging from −5 volts to 5 volts (as an example).

In each row of the pixel array of display 10, a given one of lines 44 may be used to provide a voltage Vcom (sometimes referred to as a reference voltage, power plane voltage or ground voltage) to the set of electrodes 42 in that row. Digital gate line control signals GL0 . . . GLN may be generated on respective gate lines 46 by driver circuitry 38-2. Each gate line may be coupled to the gate of an associated one of control transistors 50 in the same row as that gate line. When a row of control transistors 50 is turned on by asserting a given gate line control signal, the control transistors in that row will each route the voltage on their associated data line to their associated electrode 40. The voltage difference between each electrode 40 and its associated electrode 42 gives rise to an electric field that is used in controlling the state of the liquid crystal material in an associated liquid crystal portion 36 (i.e., a portion of layer 16 of FIG. 2).

Figure 5:
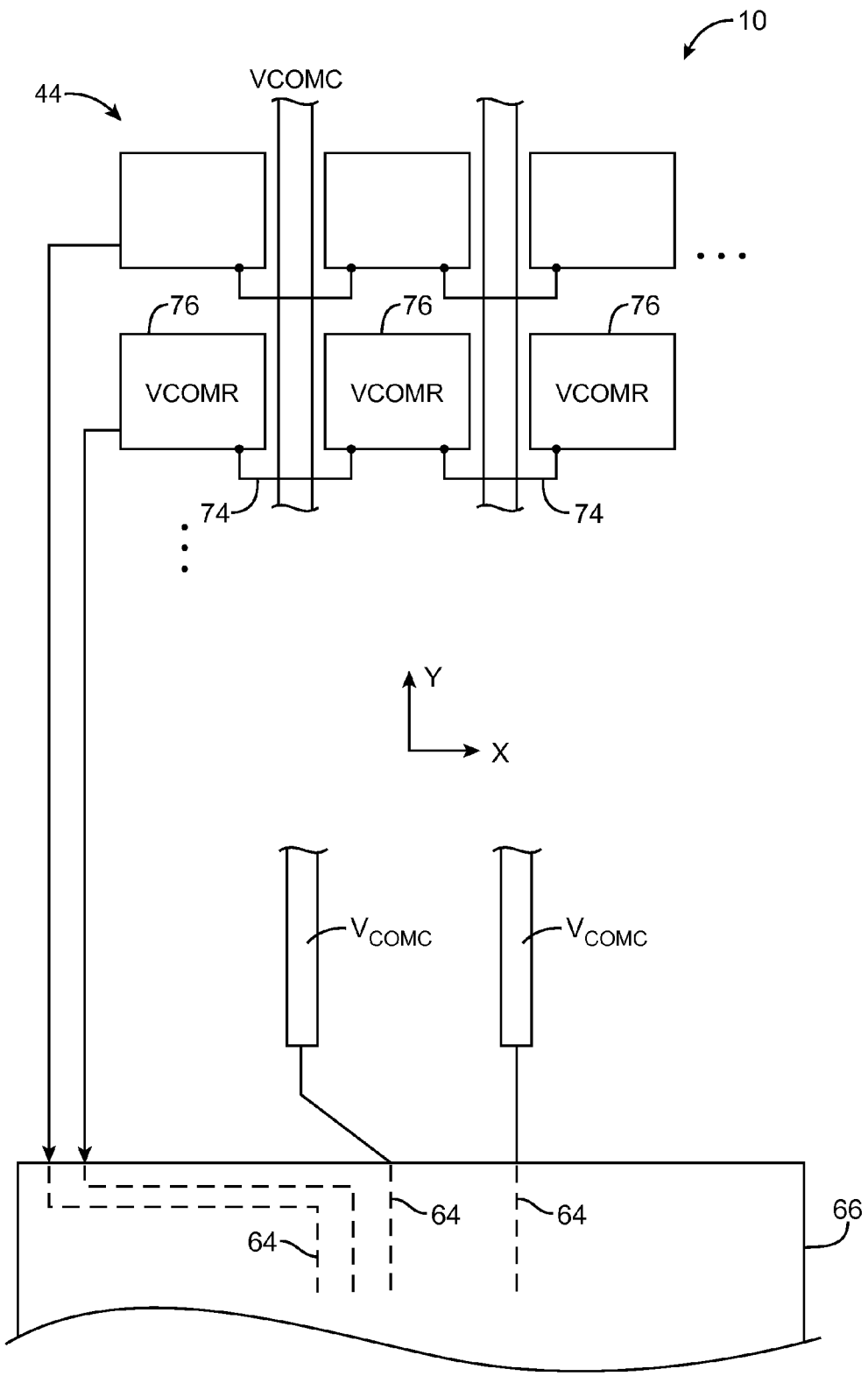
FIG. 5 is a top view of a portion of a display showing how isolating slits may be formed between conductive ground plane structures in the display in accordance with an embodiment of the present invention.

An illustrative layout that may be used in implementing Vcom paths 44 of FIG. 4 for display 10 is shown in FIG. 5. As shown in FIG. 5, display 10 may include Vcom conductor structures 44 such as square Vcom pads 76 that are interconnected using conductive Vcom jumpers 74 to form Vcom rows (called Vcomr). Vertical Vcom conductors (called Vcomc) may be interspersed with pads 76. The Vcomr and Vcomc conductors of FIG. 5 may be formed from indium tin oxide or other transparent conductive material and may be used for supporting both display and touch functions in display 10. For example, a time division multiplexing scheme may be used to allow the Vcom conductive structures to be used both as ground plane structures for pixels 52 (during display mode operations) and as touch sensor electrodes (during touch sensor mode operations).

When pixels 52 of display 10 are being used to display an image on display 10, display driver circuitry 38 (FIG. 3) may, for example, short both Vcomc and Vcomr to a ground voltage such as 0 volts or other suitable voltage (e.g., a fixed reference voltage). In this configuration, the Vcomr and Vcomc conductors may work together to serve as a part of a common ground plane (conductive plane) for display 10. Because Vcomc and Vcomr are shorted together when displaying images in this way, no position-dependent touch data is gathered.

At recurring time intervals, the image display functions of display 10 may be temporarily paused so that touch data can be gathered. When operating in touch sensor mode, the Vcomc and Vcomr conductors may be operated independently, so that the position of a touch event can be detected in dimensions X and Y. There are multiple Vcom rows (Vcomr), which allows discrimination of touch position with respect to dimension Y. There are also multiple Vcom columns (Vcomc), which allows touch position to be determined in dimension X. The Vcomc and Vcomr conductors of FIG. 5 are illustrated schematically as touch sensor electrodes 62 in FIG. 3.

Resolution requirements are typically larger for displaying images than in ascertaining touch location. As a result, it may be desirable to select a size for pads 76 that is larger than the area consumed by each image pixel. There may be, for example, a block of about 60×64 image pixels associated with an area of the size occupied by each touch sensor pad 76 (as an example).

Figure 6:
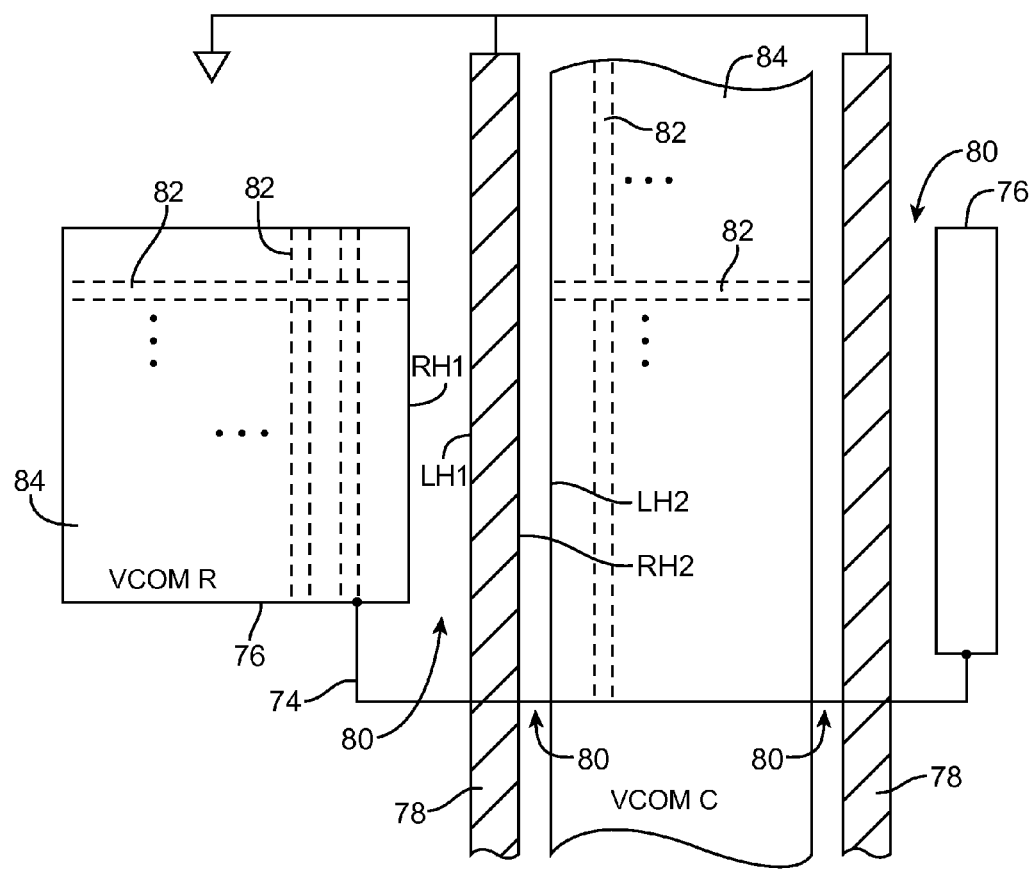
FIG. 6 is a top view of a portion of a display of the type shown in FIG. 5 showing where isolating slits may be formed in accordance with an embodiment of the present invention.

To ensure proper manufacturing uniformity and to ensure that there is satisfactory noise isolation in display 10, it may be desirable to incorporate noise-blocking ground structures into the Vcom array and to form the Vcom structures by joining together multiple smaller conductive regions. As shown in FIG. 6, for example, the Vcomr and Vcomc conductors may be formed from conductive structures that are separated from each other by gaps 82, but that are unified by an overlapping conductive material 84. Noise blocking conductors such as ground conductors 78 may be interposed between pads 76 and the columns of material that form the Vcom conductors.

In arrangements of the type shown in FIG. 6, slits 80 (sometimes referred to as gaps or isolation regions) may be formed between opposing conductive regions. For example, one of isolating slits 80 may be formed between right-hand edge RH1 of pad 76 and the opposing left-hand edge LH1 of ground conductor 78 and one of isolating slits 80 may be formed between right-hand edge RH2 of ground conductor 78 and left-hand edge LH2 of conductor Vcomc. Slits such as slits 80 may also be formed between opposing Vcomr and Vcomc regions in display configurations without ground conductors 78.

Figure 7:
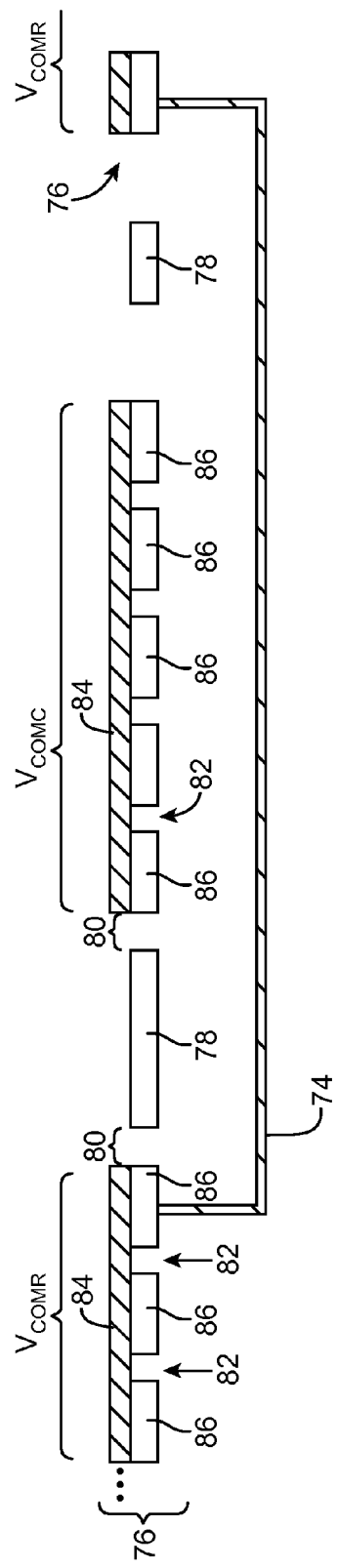
FIG. 7 is a cross-sectional side view of a portion of a display showing how planar conductive structures may incorporate isolating slits in accordance with an embodiment of the present invention.

FIG. 7 is a cross-sectional side view of a portion of display 10 of FIG. 6 showing how each section of Vcomr conductor may be formed from multiple smaller conductive areas 86 joined using overlapping layer 84. Layers such as layers 84, 86, and 78 may be formed from conductors such as indium tin oxide (as an example) and may be formed on layers of insulator (e.g., layers of clear polymer or other insulating layers on a clear insulating substrate such as glass or plastic). Patterning techniques such as etching, shadow printing, screen printing, pad-printing, ink-jet printing, lift-off, and other patterning techniques may be used in depositing and patterning the insulating and conductive layers of display 10 including the conductors shown in FIG. 7.

When operating in display mode to display images using pixels 52, conductors Vcomc and Vcomr and noise shielding conductive material 78 may be shorted together (e.g., to 0 volts or other suitable voltage) to form a common ground plane. The presence of slits 80 in this ground plane may cause parasitic electric fields to develop during operation of the display. If care is not taken, these parasitic electric fields may undesirably influence the orientation of the liquid crystal material in display 10. This effect is illustrated in FIG. 8.

Figure 8:
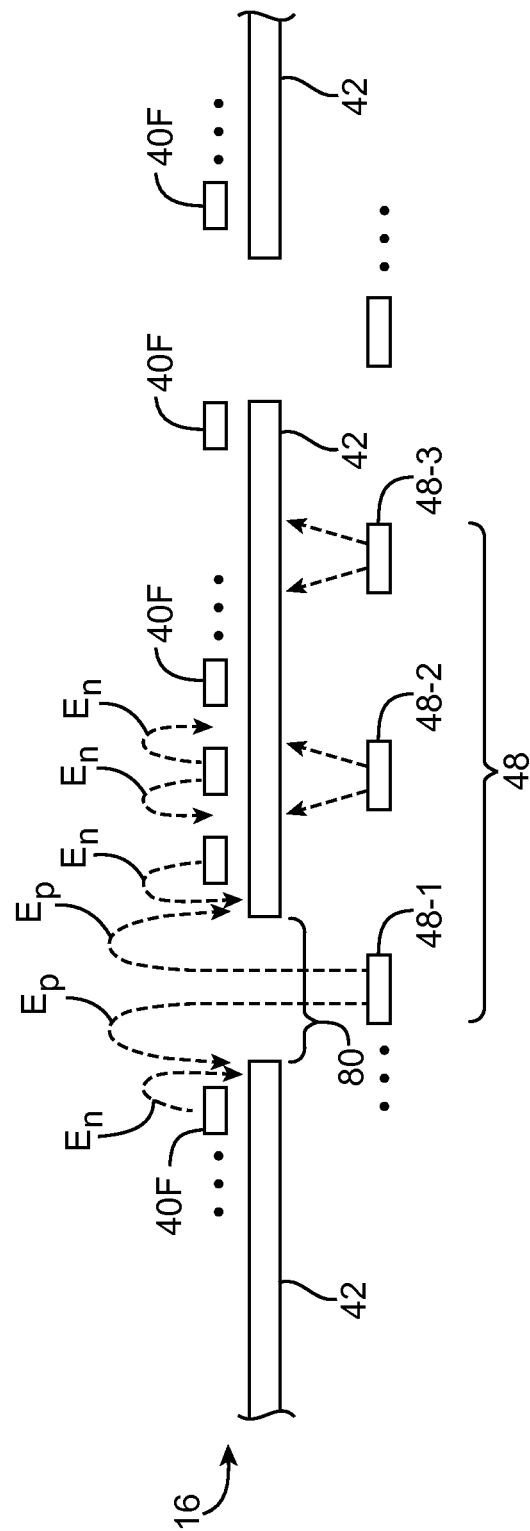
FIG. 8 is a cross-sectional side view of a portion of a display showing how parasitic field lines have the potential to disrupt normal operation in a display with data lines that are located under ground plane structures having slits of the type shown in FIG. 7 in accordance with an embodiment of the present invention.

As shown in FIG. 8, liquid crystal layer 16 may be formed above ground plane 42. Ground plane 42 may be formed from planar conductive structures such as conductors Vcomr, Vcomc, and 78 of FIG. 7 or other Vcom structures 44 and may serve as pixel electrodes 42 of FIG. 4).

During normal operation, a set of one or more electrode fingers 40F (e.g., a group of three fingers) may be controlled together to serve as one of electrodes 40 in FIG. 4 (i.e., the electrode for a particular subpixel 52). Application of a given voltage to electrode 40 causes a proportional electric field En to develop between the electrode 40 and ground plane 42. As shown in FIG. 8, liquid crystal layer 16 is located on top of ground plane 42, so the magnitude of electric field En controls the orientation of the liquid crystal material in the vicinity of electrode 40 and thereby controls the transmission of the subpixel formed from that liquid crystal material and that electrode.

Data lines 48 may be located below ground plane 42. Data lines 48 may include data lines for different colored pixels such as data lines 48-1, 48-2, and 48-3. Due to the presence of slits 80, parasitic electric fields Ep may develop between the data lines and nearby conductive structures such as electrodes 40 and ground plane 42. These parasitic fields may pass through a portion of liquid crystal layer 16 and may undesirably influence the orientation of the liquid crystals. For example, when a voltage is present on data line 48-1, data line 48-1 may give rise to a parasitic electric field Ep that passes through some of the same liquid crystal material that would normally be controlled by the electric field En. The contribution of electric field Ep to the field strength that would ideally be determined solely by the strength of field En represents a source of error in the signal. Parasitic fields from data lines such as lines 48-2 and 48-3 tend to have negligible influence on the liquid crystal layer, because fields produced from these data lines tend to terminate directly on overlapping sections of ground plane 42, as shown in FIG. 8.

Figure 9:
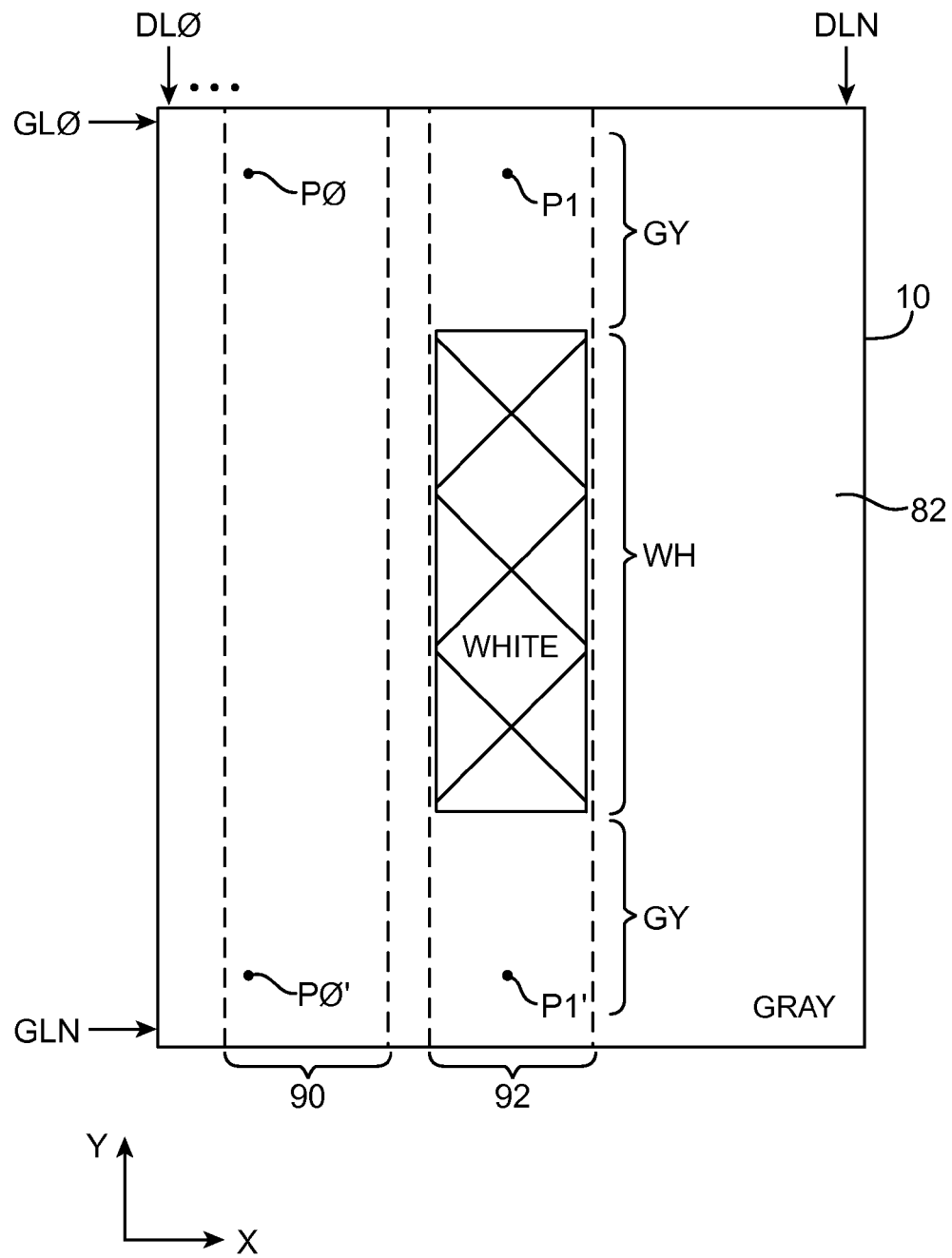
FIG. 9 is a top view of an illustrative display showing a test pattern that may be used to evaluate a display.

The potential of a display with slits to exhibit non-ideal behavior due to parasitic fields from data lines that overlap with the slits can be characterized using a test pattern of the type shown in FIG. 9. As shown in FIG. 9, gate lines GL0 . . . GLN may each be used to address a respective row of pixels 52 in display 10 and data lines DL0 . . . DLN may each be used to route a data line signal along a respective column of pixels 52 in display 10. During operation, the signals on data lines DL0 . . . DLN are adjusted while gate lines GL0 . . . GLN are asserted in sequence. The signal on a gate line may be asserted by taking that line high to produce a square wave of about 16 microseconds in duration (as an example). Gate lines GL0 . . . GLN may be asserted one after another (scanned) in the −Y direction or other gate line scanning patterns may be used.

Each full scan of display 10 generally corresponds to a frame of data line signals. To avoid creating undesired movement of ionic compounds in the display, images are generally driven onto the display twice, once in a positive frame in which the data lines have a first set of polarities and once in a negative frame in which the polarities of the signals on the data lines are each respectively reversed.

The test pattern of FIG. 9 contains two vertical columns. Column 90 contains points P0 and P0' and includes only gray pixels. Gray pixels are produced by driving an intermediate data line voltage into the display (e.g., +/−2.5 volts in a display configuration where the data line voltage ranges between +/−5 volts). Column 92 contains points P1 and P1' and includes a combination of white and gray pixel regions. In particular, column 92 contains gray pixels in regions GY at the top and bottom of the column and white pixels in region WH in the middle of the column.

Figure 10:
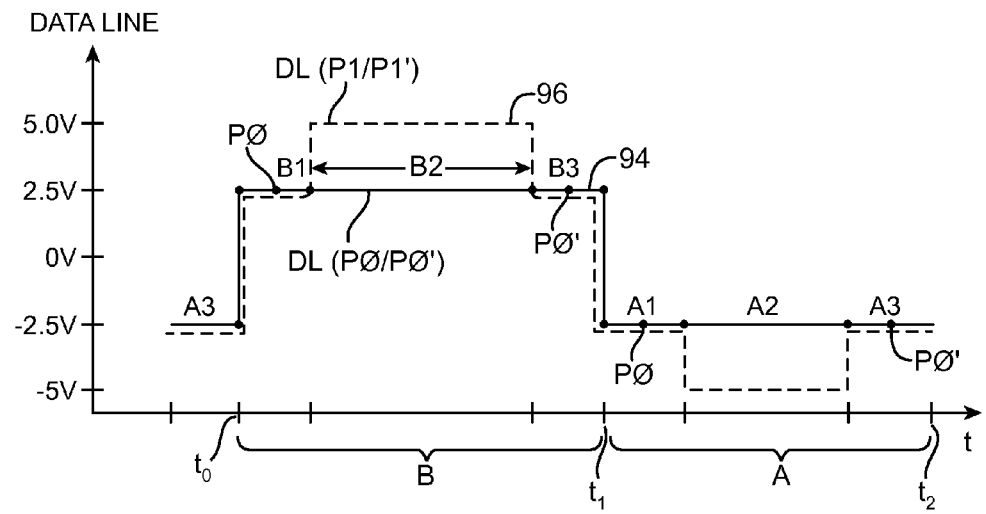
FIG. 10 is a graph of positive frame and negative frame data line voltages that may be used to reproduce a test pattern of the type shown in FIG. 9 in a display in accordance with an embodiment of the present invention.

The graph of FIG. 10 shows data lines signals that may be used when scanning through column 90 and when scanning through column 92. Data line signals are supplied in frames. During positive frames, the data line signals are positive. During negative frames, the data lines signals are negative. Positive and negative frames typically alternate to ensure that the pixels in the display are not exposed to net electric fields over time.

Solid line 94 corresponds to an illustrative data signal DL (P0/P0') that may be used for the pixels in column 90. During positive frame B, data line signal DL (P0/P0') is held at 2.5 volts to produce the gray color of column 90. During negative frame A, data line signal DL (P0/P0') is held at −2.5 volts (i.e., its polarity is reversed with respect to positive frame B). Point P0 in FIG. 9 corresponds to points P0 on segments B1 and A1 in FIG. 10. Point P0' in FIG. 9 corresponds to points P0' on segments B3 and A3 in FIG. 10.

Dashed line 96 corresponds to an illustrative data signal DL (P1/P1') that may be used for the pixels in column 92. During segments B1 and B3 of positive frame B, data line signal DL (P1/P1') is held at 2.5 volts to produce the gray color of column 84 in regions GY at the top and bottom of column 92, respectively. Similarly, data line signal DL (P1/P1') is held at −2.5 volts during segments A1 and A3 of negative frame A.

When producing white in region W of column 92, the data line is driven to +/−5 volts (in this example). In particular, during segment B2 of positive frame B, data line signal DL (P1/P1') is held at 5 volts and during segment A2 of negative frame A, data line signal DL (P1/P1') is held at −5 volts.

Figure 11:
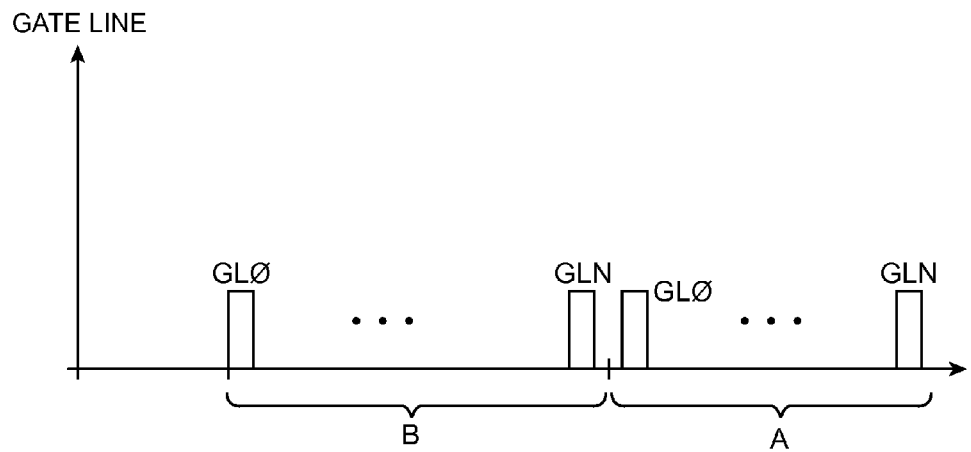
FIG. 11 is a graph of illustrative gate line control signals that may be applied to a display in conjunction with the data line voltages of FIG. 10 in accordance with an embodiment of the present invention.

FIG. 11 shows illustrative gate line signals that may be asserted when scanning the gate lines for each of the frames of FIG. 10.

Figure 12:
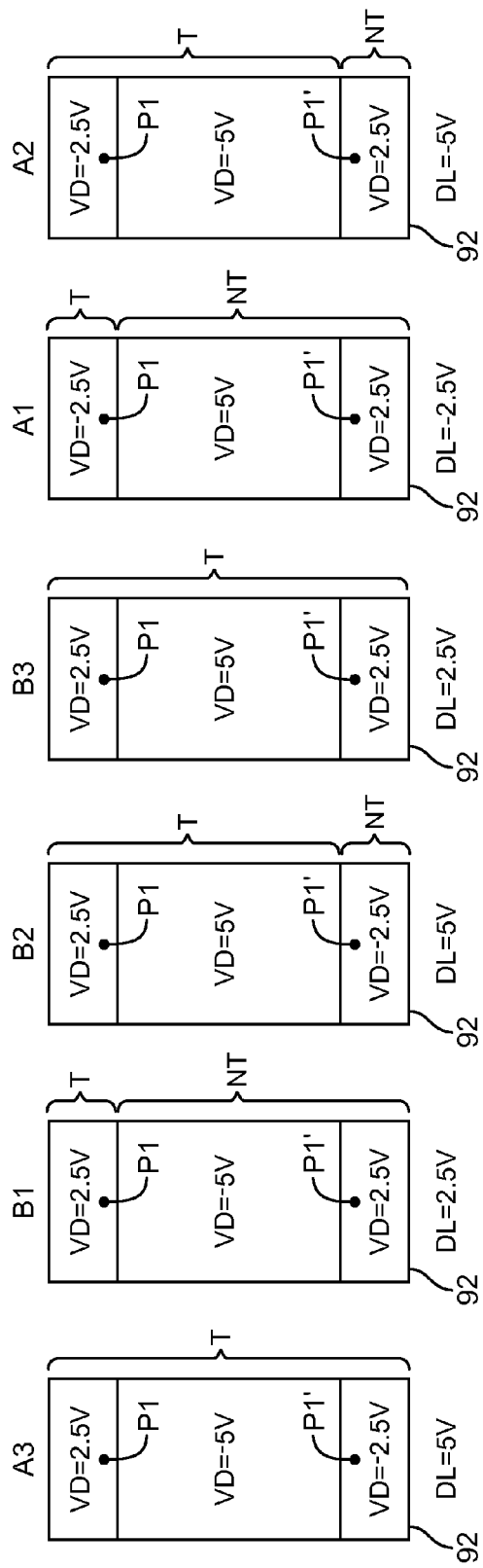
FIGS. 12 and 13 show location-dependent data line voltages and location-dependent electrode voltages that may be generated across a display when using signals of the type shown in FIGS. 10 and 11 to reproduce a test pattern of the type shown in FIG. 9 in accordance with an embodiment of the present invention.

The magnitude of parasitic field Ep in each of the regions of columns 90 and 92 of FIG. 9 is related to the difference between the voltage VD on electrode 40 and the data line associated with the pixels of each of these regions. FIG. 12 shows illustrative values of VD that may be produced in column 92 at various points in time during the A and B frames.

For example, the version of column 92 that is labeled "A3" corresponds to the point in time at which segment A3 has just completed and segment B1 is about to begin. At this point in time, all of negative A frame has completed so that the VD values of all of the electrodes 40 in column 92 have acquired their desired value from the data line signal DL (P1/P1'). Because all of the VD values have been toggled to their intended values, all regions of the "A3" version of column 92 are labeled with a "T" to denote their toggled state.

As another example, the version of column 92 that is labeled "B1" corresponds to the point in time at which segment B1 has just completed and segment B2 is about to begin. At this point in time, the VD values in the upper part of the positive B frame that includes point P1 (i.e., the upper region GY in FIG. 9) have acquired their desired values (i.e., these VD values have toggled as indicated by label T), whereas the VD values in the rows lower down in column 92 have not yet toggled (as indicated by label "NT"). Because the NT rows in column 92 have not yet been scanned and have not yet been driven to their new values, the values of VT on the electrodes 40 in the NT rows remains unchanged relative to their state in the immediately preceding A3 version of column 92.

As the gate lines of the column 92 are scanned in sequence throughout the remainder of the B frame, the rest of electrodes 40 toggle. This process repeats itself during the A frame, as indicated in the A1, A2, and A3 versions of column 92 of FIG. 12.

The data line values that are applied along each of the columns of pixels in column 92 at each stage of the gate line scanning process are set forth at the bottom of each of the versions of column 92 in FIG. 12.

Figure 13:
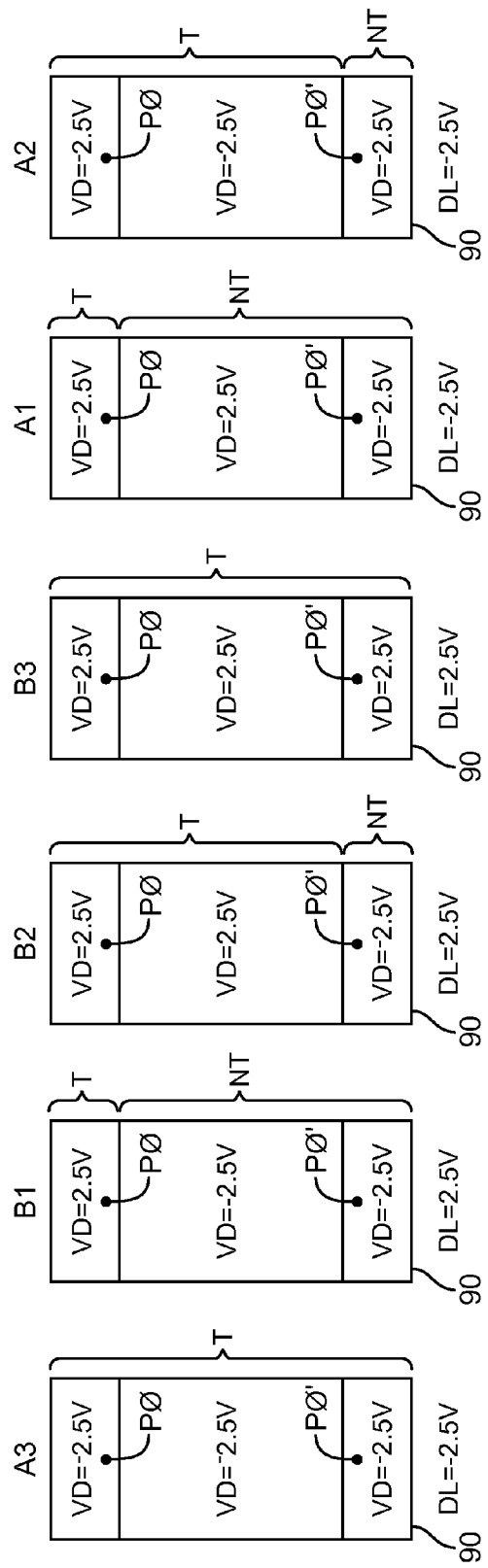

FIG. 13 is similar to FIG. 12, but shows electrode voltages VD for column 90 and shows corresponding values for data line signal DL (P0/P0') at each stage of the scanning process.

The magnitude of the parasitic electric field Ep that is produced during operation of the display depends on the voltage difference between the data line that lies near slit 80 (e.g., data line 48-1 in the FIG. 8 example) and the electrodes 40 adjacent to the slit. If the difference between the electrode voltage (VD) and data line voltage (DL) is high, parasitic field Ep will be stronger. If the difference between electrode voltage VD and date line voltage DL is low, parasitic field Ep will be weaker.

The tables of FIGS. 14 and 15 plot the voltage difference VD−DL at various stages during the A and B frames. The table of FIG. 14 corresponds to the region of display 10 in column 92 (FIG. 9) and includes calculations of VD−DL for points P1 and P1'. The table of FIG. 15 corresponds to the region of display 10 in column 90 (FIG. 9) and includes calculations of VD−DL for points P0 and P0'. Comparison of the average of the absolute value of the VD−DL entries for P0, P0', P1, and P1' shows which sections of display 10 are particularly prone to adverse impact from parasitic field Ep. In particular, the entries of the tables of FIGS. 14 and 15 show that the field strength Ep will tend to be greater at point P1 than at point P0 and that the field strength Ep will tend to be significantly greater at point P1' than at point P0'. The presence of slits 80 in the Vcom conductors of display 10 therefore gives rise to a potential for undesired shifts in brightness in display 10, particularly when comparing nearby regions such as locations in the vicinity of point P1' and locations in the vicinity of point P0'.

Figure 16:
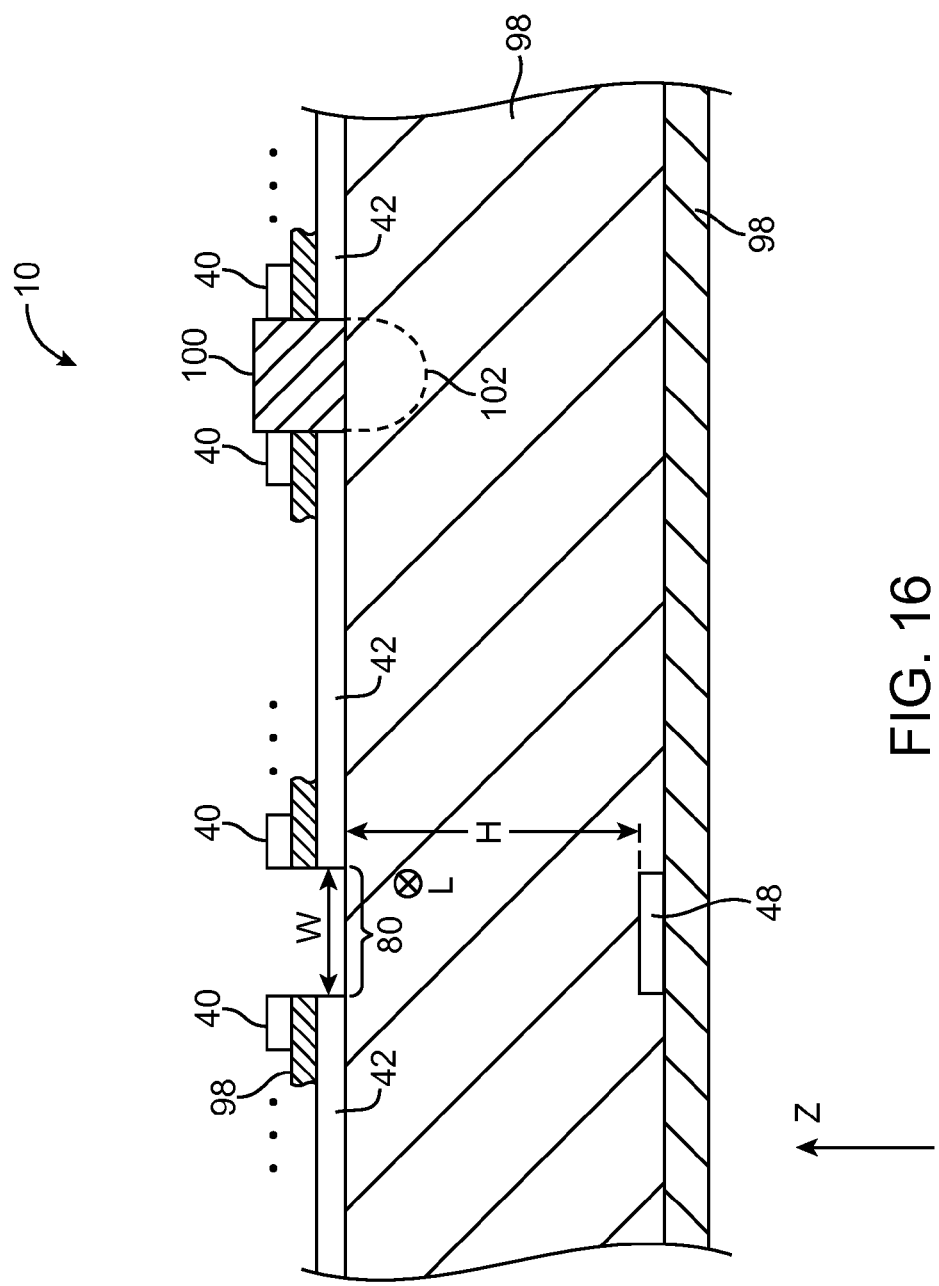
FIG. 16 is a cross-sectional side view of a display with a slit in its ground plane and an underlying data line in accordance with an embodiment of the present invention.

The structures of display 10 can be configured to mitigate these potentially adverse effects. With one suitable arrangement, the location of the data line that is near to the ground plane slot is chosen to reduce parasitic field strength. As shown in FIG. 16, display 10 may have insulating layers 98 and 100. Insulators 98 and 100 may be formed from plastic or other suitable dielectric materials. Slits 80 may be filled with a dielectric such as air or a solid dielectric such as plastic (as illustrated by illustrative solid dielectric 100 and portion 102 of layer 98 in right-hand slit 80 of FIG. 16). Insulators such as insulators 98 and 100 may be used to support and separate conductive structures from each other such as electrodes 40, ground plane 42, and date lines 48.

Ground plane 42 may sometimes be referred to as a power plane, reference voltage plane, reference plane, ground electrode, power electrode, reference electrode, ground conductive structures, power plane conductive structures, reference conductive structures, planar conductive structures, etc. Slits 80 in ground plane 42 may allow parasitic electric fields such as field Ep of FIG. 8 to develop between data lines 48 and nearby conductive structures such as electrodes 40 and ground plane 42. Slits 80 may be characterized by a longitudinal dimension L (into the page in the orientation of FIG. 16) and a transverse dimension W (between opposing portions of ground plane 42). Slits 80 may be curved or angled slightly along their length L or may be straight along dimension L. Ground plane 42 and data lines 48 are vertically separated in dimension Z by distance (height) H.

Figure 17:
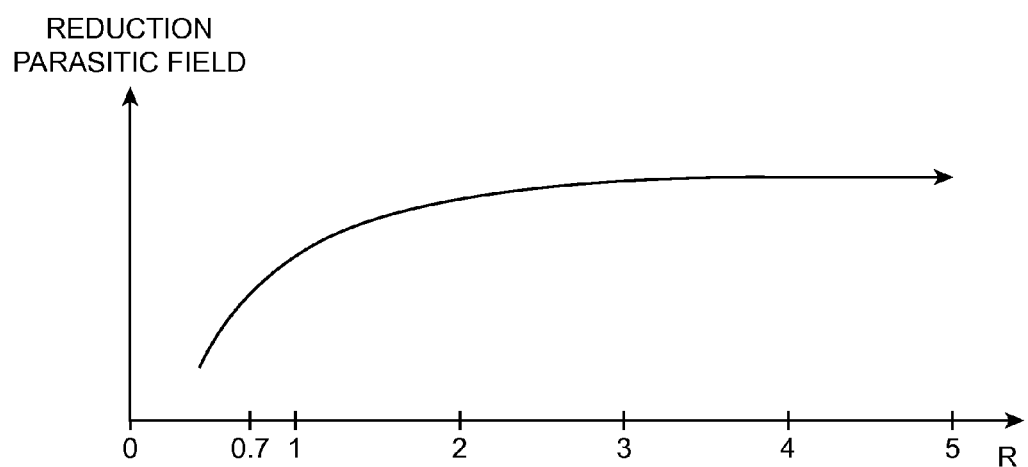
FIG. 17 is a graph showing how the relative positions of the slit and data line of FIG. 16 may affect display performance metrics such as crosstalk in a display in accordance with an embodiment of the present invention.

The ratio R of height H to slit width W can influence the strength of parasitic field Ep, as indicated by the graph of FIG. 17. At larger ratios R, parasitic field strength is reduced relative to smaller ratios R. At the highest values of ratio R, field strength decreases less rapidly than at lower values of ratio R, so the largest parasitic field strength reduction per unit height is at lower R values (i.e., in the vicinity of R=1.0). In general, display 10 may be constructed with any suitable ratio R (i.e., R greater than 0.5, R greater than 0.7, R greater than 1.0, R greater than 1.5, R greater than 2.0, R greater than 3.0, etc.).

Figure 18:
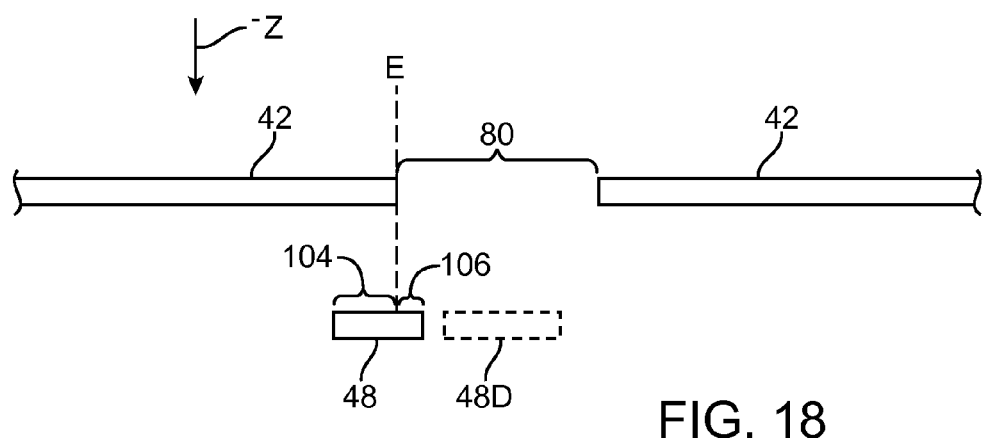
FIG. 18 is a cross-sectional side view of a portion of a display showing how a data line may be located so that only part of the data line overlaps with a ground plane slit in accordance with an embodiment of the present invention.
Figure 19:
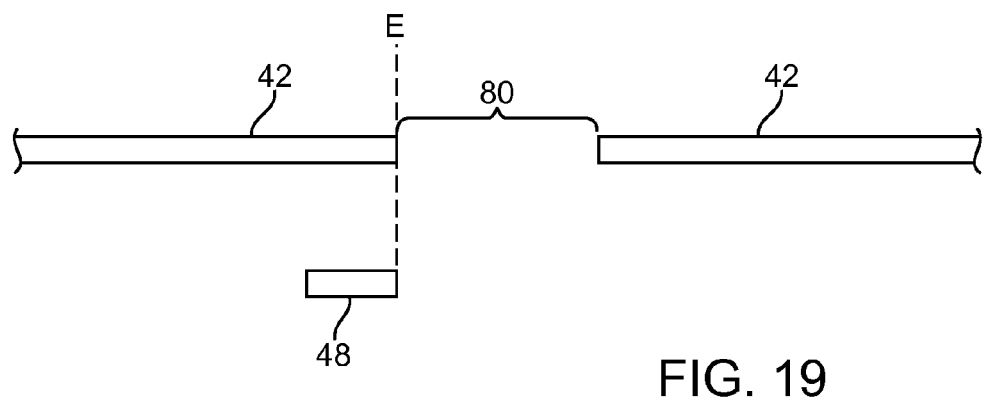
FIG. 19 is a cross-sectional side view of a portion of a display showing how a data line may be located so that the data line does not overlap with a ground plane slit in accordance with an embodiment of the present invention.

Another way to reduce the strength of parasitic electric field Ep is to locate data line 48 so that it does not completely overlap slit 80. As shown in FIG. 18, if a data line is located in the position shown by dashed lines 48D, the data line will completely overlap slit 80. In this position, the data line may give rise to non-negligible amounts of parasitic electric field Ep. By moving the data line to the position shown by data line 48 in FIG. 18, portion 104 of data line 48 will lie to the left of edge E and portion 106 of data line 48 will lie to the right of edge E. In this configuration, ground plane 42 will partially overlap line 48 (i.e., ground plane 42 will cover part of line 48 and slit 80 will cover part of line 48 when viewed from direction –Z). Greater reduction in parasitic field strength Ep may be obtained by placing line 48 so that all of line 48 lies to the left of edge E under ground plane 42, as shown in FIG. 19.

Figure 20:
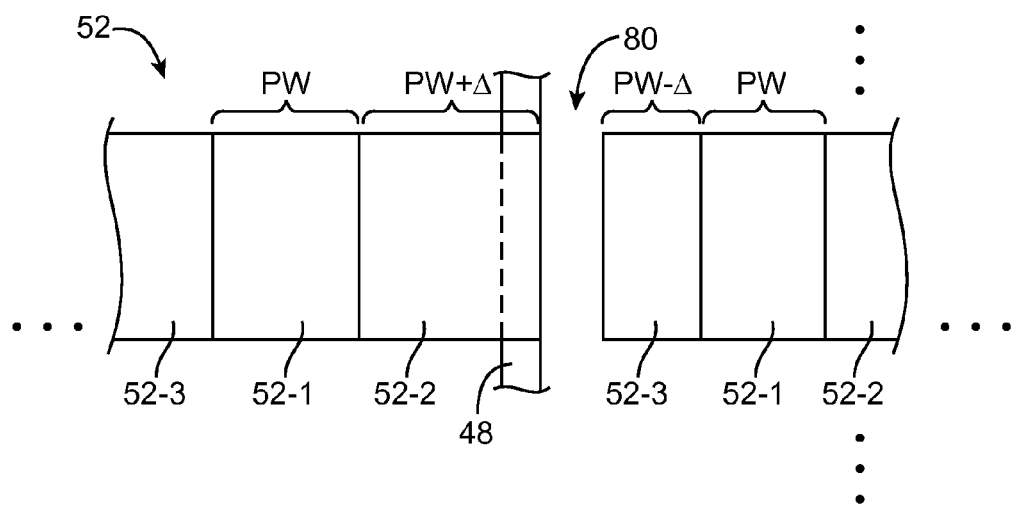
FIG. 20 is a top view of a portion of a display showing how a row of pixels of different colors may have different electrode footprints and may be arranged so that a ground plane slit that is interposed among the pixels is positioned relative to a data line to reduce crosstalk in accordance with an embodiment of the present invention.

In color displays, pixels 52 may be associated with colored filter elements of different colors. For example, display 10 may have red pixels, green pixels, and blue pixels. Each pixel may have a set of electrode fingers 40F or other structures to form one of electrodes 40 and each pixel may be associated with a portion of ground plane 42. As shown in FIG. 20, pixels 52 may be arranged in stripes (e.g., stripes associated with associated rows of display 10). For example, a row of pixels may include pixels of three different colors such as pixels 52-1, pixels 52-2, and pixels 52-3 arranged in the repeating pattern of FIG. 20. Pixels (i.e., the outlines of the pixel electrodes and underlying Vcom conductor) may have any suitable shapes (e.g., rectangular shapes, shapes with diagonal or curved edges, etc). Slits such as slit 80 of FIG. 20 may be interposed between pairs of adjacent pixels.

Slits 80 may be formed between pixels of any suitable colors. As one example, pixels 52-1 may be green pixels and pixels 52-2 and 52-3 may be red and blue pixels, respectively (or blue and red pixels). With this type of configuration, slits 80 will be interposed between pairs of slot-straddling red and blue pixels in each row of display 10. The area consumed by each pixel 52 (i.e., the footprint of that pixel including its electrode 40 when viewed from above) may be the same or different pixels may have different sizes. For example, pixels 52-1 may be characterized by lateral dimension PW, whereas pixels 52-2 may be characterized by lateral dimension PW+L and pixels 52-3 may be characterized by lateral dimension PW–Δ. Area changes may be made to balance differences in noise between pixels, to balance relative brightness as light is transmitted through the color filter elements of the pixels, etc. Pixel area changes may be implemented by adjusting the size of fingers 40F, by adding and/or subtracting fingers 40F from electrodes 40, etc.

Figure 21:
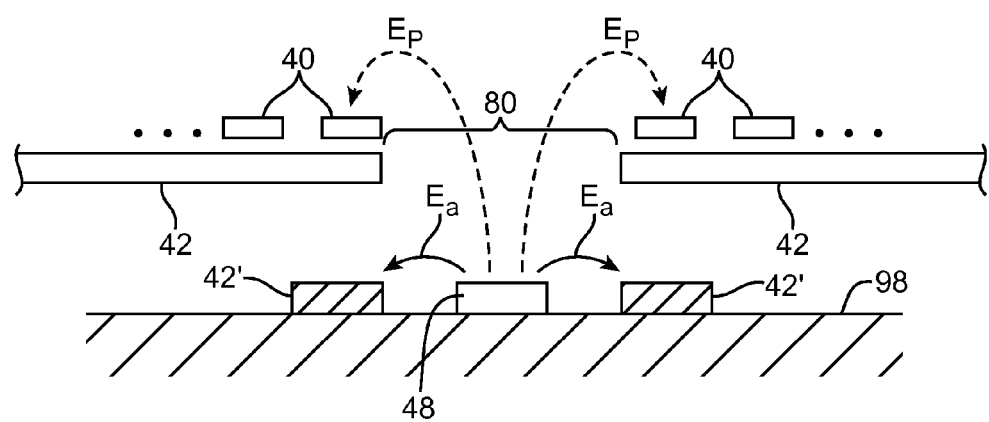
FIG. 21 is a side view of a portion of a display showing how coplanar ground structures such as one or more parallel ground lines may be placed adjacent to a data line under a ground plane slit to reduce parasitic field strength in accordance with an embodiment of the present invention.

If desired, the strength of parasitic electric field Ep may be reduced using localized ground structures such as ground structures 42' of FIG. 21. Ground structures 42' may be formed from conductive materials (e.g., indium tin oxide) and may be formed adjacent to data line 48 on the same substrate as data line 48. With this type of arrangement, structures 42' and data line 48 will be coplanar (see, e.g., structures 42' and line 48 on substrate 98 in FIG. 21). Ground structures 42' may have the shapes of lines that run parallel to opposing sides of data line 48. Although line 48 of FIG. 21 is shown as being located under slit 80, line 48 may be partly or fully located under ground plane 42, as described in connection with FIGS. 18 and 19. Ground structures 42' may be shorted to a ground voltage of 0 volts or other suitable voltage). Because ground structures 42' are located adjacent to data line 48, ground structures 42' may serve as shielding structures that help shield the liquid crystal material in display 10 from parasitic fields. Even when data line 48 is driven to a relatively large positive or negative voltage relative to electrodes 40, electric field lines such as electric field lines Ea will tend to terminate on nearby ground structures 42' rather than penetrating through slit 80 to form parasitic fields Ep. The presence of ground structures 42' may therefore reduce the adverse effects of parasitic fields Ep.

The pattern in which gate lines 46 are scanned may also affect display performance. In the illustrative scenarios of FIGS. 12, 13, 14, and 15, it was generally assumed that all gate lines 46 in display 10 were being scanned from top to bottom in sequence. If desired, gate lines 46 may be scanned using different patterns to help minimize the effects of parasitic fields Ep on display performance.

Figure 22:
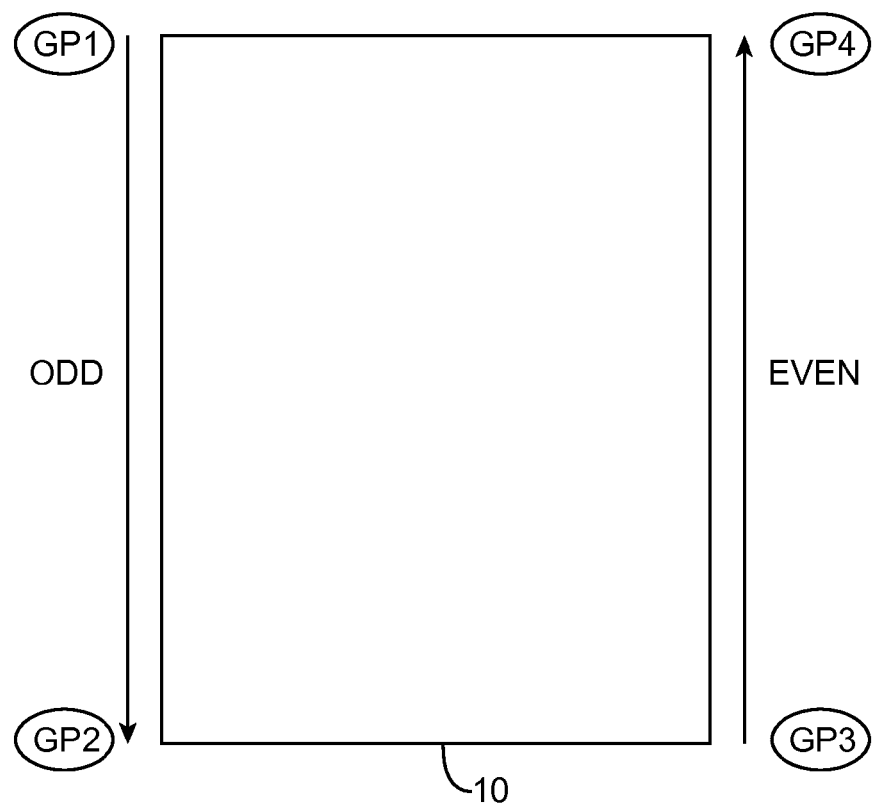
FIG. 22 is a top view of a display showing how gate line signals can be sequentially scanned in up and down directions to improve display uniformity in accordance with an embodiment of the present invention.

For example, odd gate lines and even gates lines may be controlled separately. FIG. 22 shows an illustrative gate line scan pattern that may be used in display 10. As shown in FIG. 22, odd gate lines may be scanned from top to bottom (i.e., from position GP1 to position GP2), whereas even gate lines may be scanned from bottom to top (i.e., from position GP3 to GP4). With this type of configuration, the odd gate lines would tend to exhibit the greatest VD–DL values at the bottom portion of display 10, as described in connection with points P1' and P0' of FIG. 9, whereas the even gate lines (which are scanned in the opposite direction) would tend to exhibit the greatest VD–DL values at the top portion of display 10. Parasitic field effects from the odd and even scanning directions would therefore tend to counterbalance each other and improve display uniformity.

Figure 23:
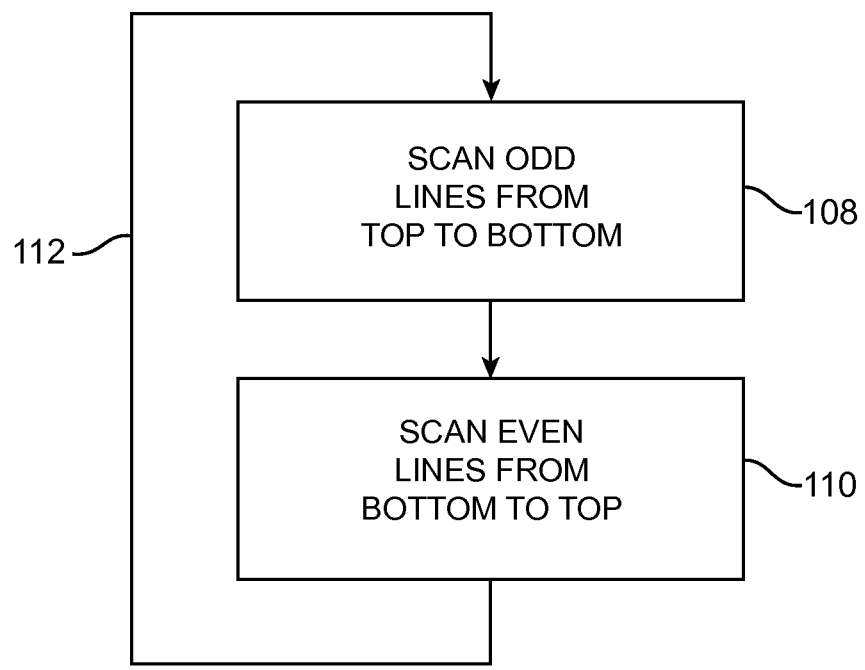
FIG. 23 is a flow chart of illustrative steps involved in operating a display using a scheme of the type shown in FIG. 22 in accordance with an embodiment of the present invention.

Illustrative steps involved in operating display 10 using a gate line scanning pattern of the type shown in FIG. 22 are shown in FIG. 23. At step 108, odd gate lines 46 (e.g., gate lines GL1, GL3, GL5, etc.) may be scanned from top to bottom in display 10 using circuitry 38-2 (FIG. 3). During the odd gate line scanning operations of step 108, the signals on data lines 48 may be adjusted by display driver circuitry 38-1 (FIG. 3) to ensure that a desired image is created on display 10. After odd line scanning operations for a frame are complete, circuitry 38 may be used to scan the even lines in the same frame, scanning from the bottom of display 10 to the top (step 110). As indicated by line 112, this process may be repeated continuously so that a series of image frames may be displayed on display 10.

Figure 24:
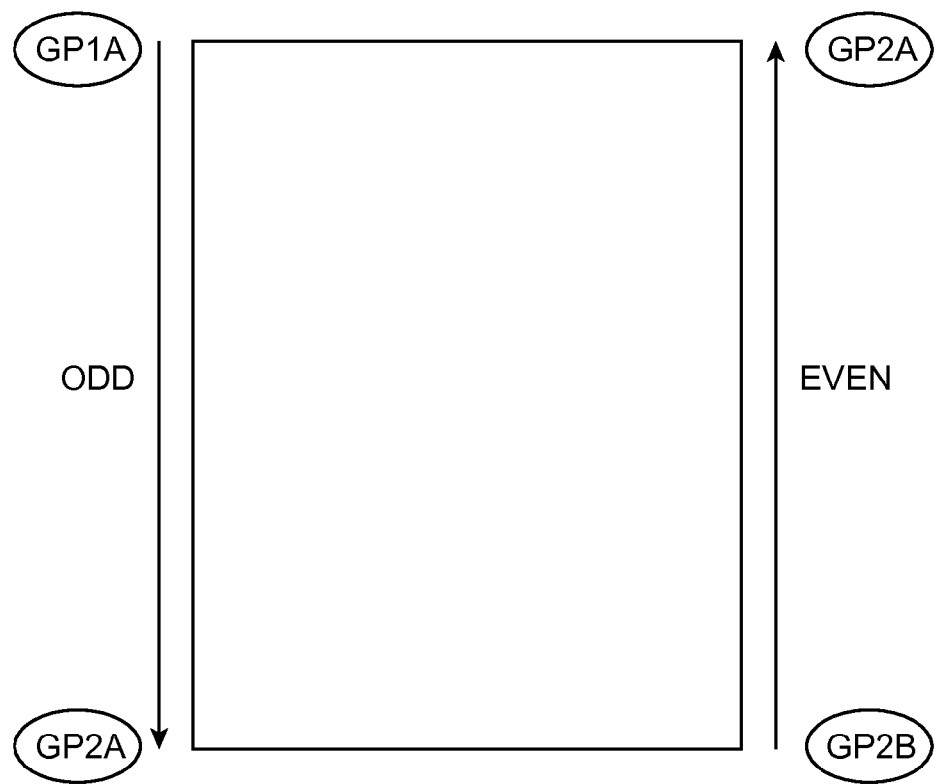
FIG. 24 is a top view of a display showing how gate line signals can be simultaneously scanned in up and down directions to improve display uniformity in accordance with an embodiment of the present invention.

Another gate line scan pattern that may be used is illustrated in FIG. 24. With the gate line scanning configuration of FIG. 24, the odd and even gate lines are scanned simultaneously in opposing directions. For example, the odd gate lines may be scanned from position GP1A to position GP2A at the same time that the even gate lines are being scanned from position GP1B to GP2B.

Figure 25:
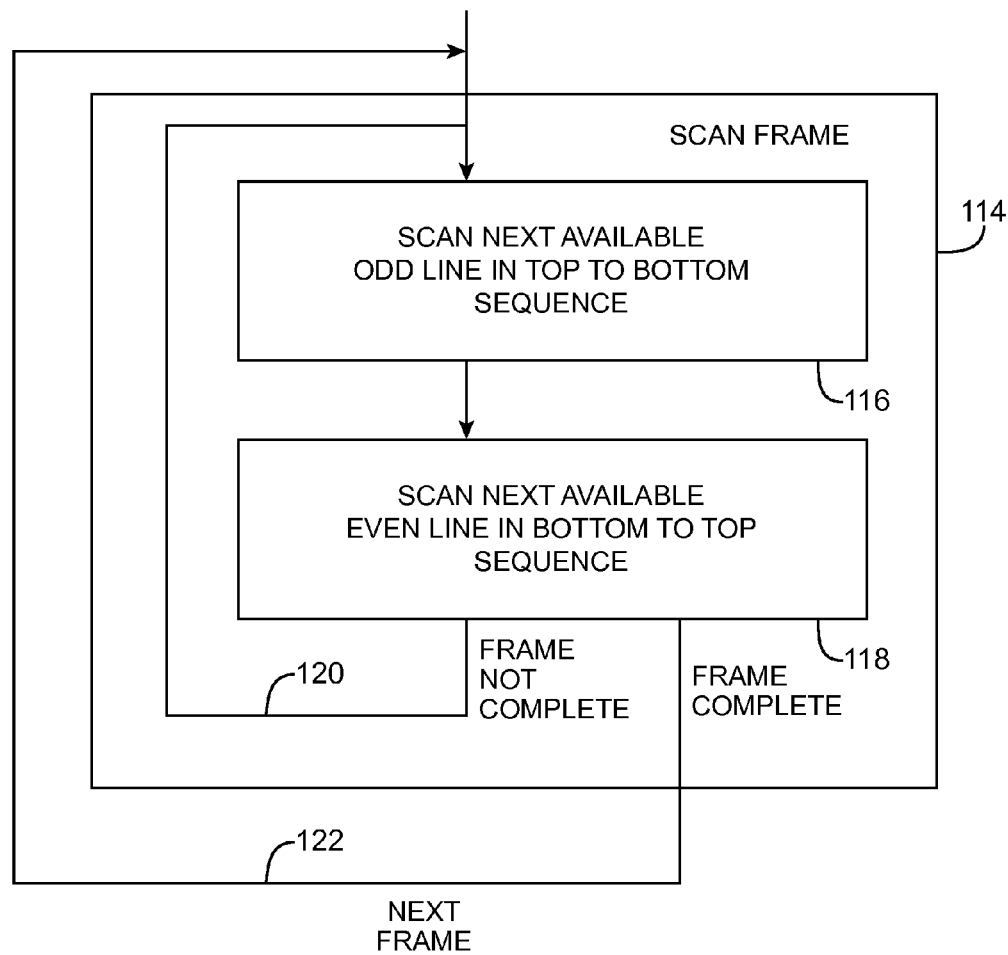
FIG. 25 is a flow chart of illustrative steps involved in operating a display using a scheme of the type shown in FIG. 24 in accordance with an embodiment of the present invention.

Illustrative steps involved with this approach are shown in FIG. 25. Step 114 of FIG. 25 involves performing scan operations for an image frame. Line 122 indicates that frames are scanned repeatedly, one after another, during operation of display 10. Steps 116 and 118 and line 120 illustrate how circuitry 38 may (as an example) alternate between odd and even lines when scanning both odd and even lines simultaneously using the pattern of FIG. 24. First, circuitry 38 may assert a gate line signal on an odd gate line (e.g., GL1). After asserting GL1, circuitry 38 may assert a gate line signal on the next available even gate line (e.g., GL1000 in a 1000 row display). As indicated by line 120, processing then loops back to step 116, where circuitry 38 asserts the next available odd line (i.e., GL3, which is the next line after GL1). After scanning GL3 at step 116, circuitry 38 may assert the gate line signal on line GL998, which is the next available even line (scanning from bottom to top as shown in FIG. 24). Alternating in this way, circuitry 38 can scan all odd gate lines from top to bottom while simultaneously (in a line-by-line alternating fashion) scanning all even gate lines from bottom to top. The scan patterns of FIGS. 22, 23, 24, and 25 may be performed for both positive frames and negative frames.

Figure 26:
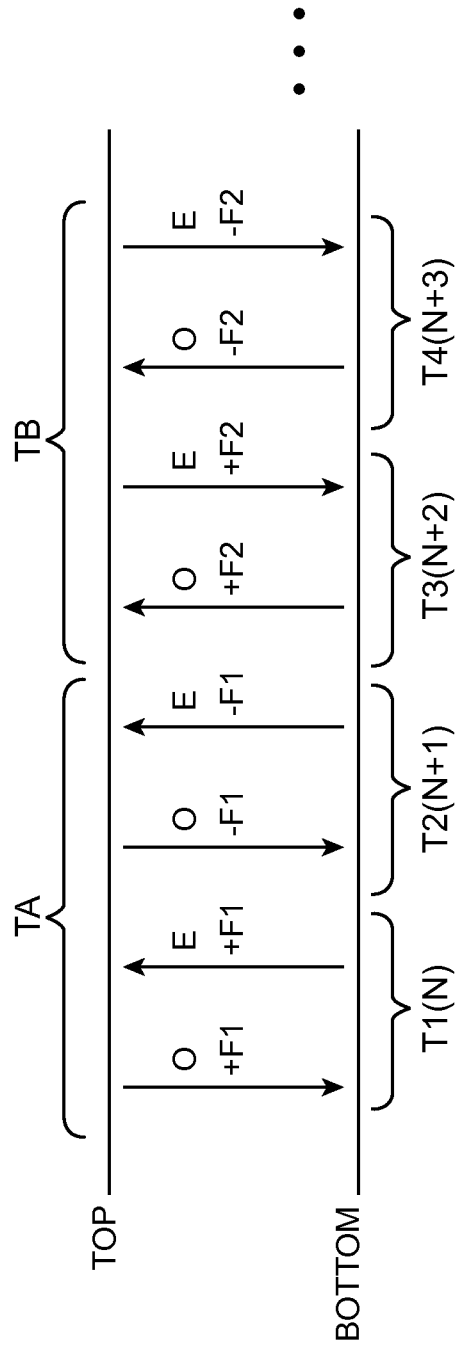
FIG. 26 is a diagram of an illustrative gate line scan pattern that may be used across a repeated pattern of four sequential frames to enhance display uniformity in accordance with an embodiment of the present invention.

To ensure that the data line voltages on the positive and negative frames cancel each other out as much as possible (and thereby ensure minimal movement of ionic compounds in display 10 due to net electric fields), it may be desirable to use a gate line scanning pattern of the type shown in FIG. 26. With the pattern of FIG. 26, there are four scanning time periods (T1, T2, T3, and T4), after which the pattern of FIG. 26 is repeated. Time period T1 corresponds to frame N (e.g., a first positive frame +F1), time period T2 corresponds to frame N+1 (e.g., a first negative frame −F1), time period T3 corresponds to frame N+2 (e.g., a second positive frame +F2), and time period T4 corresponds to frame N+3 (e.g., a second negative frame −F2).

The scanning operations of T1 and T2 fall within a first time period TA (covering the first positive frame and the first negative frame). The first negative frame represents an inverted version of the first positive frame. The scanning operations of T3 and T4 fall within a second time period TB (covering the second positive frame and the second negative frame). The second negative frame is an inverted version of the second positive frame.

During time period T1, odd gate lines O for first positive frame +F1 may be scanned from top to bottom (i.e., from a first edge of display 10 to an opposing second edge of display 10) and even gate lines E for first positive frame +F1 are scanned from bottom to top. During time period T2, odd gate lines O for are scanned from top to bottom and even gate lines E are scanned from bottom to top for first negative frame −F1. Time period T3 corresponds to the second positive frame +F2 and is used to scan odd gate lines O from bottom to top and is used to scan even gate lines E from top to bottom. In time period T4, which corresponds to second negative frame −F2, odd gate lines O are scanned from bottom to top and even gate lines E are scanned from top to bottom.

The odd and even scanning operations within each of time periods T1, T2, T3, and T4 may be performed using a sequential scanning arrangement of the type described in connection with FIGS. 22 and 23 or may be performed using an arrangement of the type described in connection with FIGS. 24 and 25 (e.g., an arrangement with odd and even lines alternating). The scanning operations of the pattern shown in FIG. 26 create balance between the positive and negative frames. For example, the pixel voltages (e.g., the data line voltages minus the Vcom voltages) for pixels in the positive and negative frames are balanced, because pixel voltages that are impressed on the image pixels in connection with the odd line scanning operations of first positive frame +F1 are matched by the pixel voltages that are impressed on the image pixels in connection with the odd line scanning operations of the first negative frame −F1. The voltages associated with the even line scanning of frame +F1 are likewise balanced by the voltages associated with the even line scanning of frame −F1. The voltages associated with the odd and even gate lines in positive frame +F2 are also balanced by the respective voltages of the odd and even gate lines in negative frame −F2.

Figure 27:
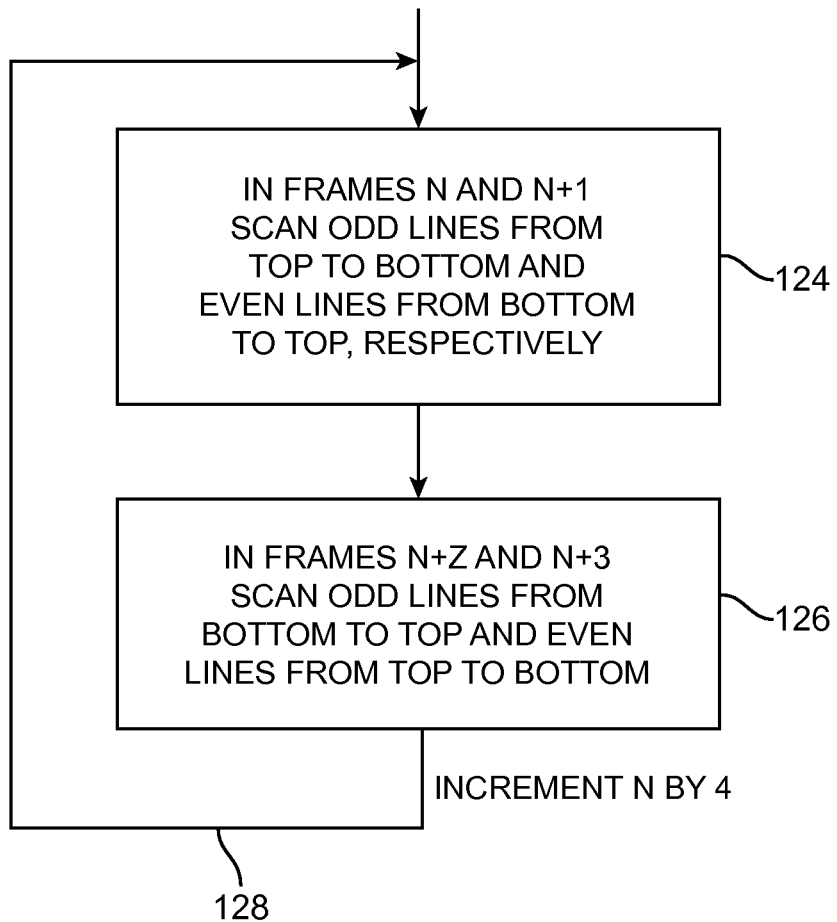
FIG. 27 is a flow chart of illustrative steps involved in using a gate line scan pattern of the type shown in FIG. 26 in accordance with an embodiment of the present invention.

FIG. 27 shows illustrative steps that may be used in scanning display 10 using a gate line scan pattern of the type shown in FIG. 26. In the flow chart of FIG. 27, the first positive frame +F1 (i.e., the frame in period T1) corresponds to frame N, the first negative frame −F1 (i.e., the frame in period T2) corresponds to frame N+1, the second positive frame +F2 (i.e., the frame in period T3) corresponds to frame N+2, and the second negative frame −F2 (i.e., the frame in period T4) corresponds to frame N+4.

At step 124, in frames N and N+1, the odd gate lines O may be scanned from top to bottom and the even gate lines may be scanned form bottom to top, as described in connection with time periods T1 and T2 in FIG. 26. At step 126, in frames N+2 and N+3, the odd gate lines may be scanned from bottom to top and the even gate lines may be scanned from top to bottom, as described in connection with time periods T3 and T4 of FIG. 26. Following step 126, the value of N may be incremented by 4 and processing may loop back to step 124 to begin processing data for subsequent frames, as indicated by line 128.

Color non-uniformity may result from the presence of parasitic electric fields Ep that affect pixels of some colors more than others. Consider, as an example, a display having a configuration of the type shown in FIG. 28. With this type of arrangement, slits 80 are interposed between blue pixels B and red pixels R, whereas green pixels G are interposed between red and blue pixels with no intervening ground plane slits. The data lines for the blue and green pixels (GDL and BDL in the example of FIG. 28) are covered by ground plane 42, so the voltages on the GDL and BDL lines will tend not to affect the operation of display as much as the red data line.

The data line for the red pixel (labeled RDL in this example) is located near to slit 80 (e.g., RDL may be in partial or full overlap with slit 80) and may give rise to parasitic electric fields as described in connection with line 48-1 of FIG. 8. In addition to any fields that may develop between red data line RDL and ground plane 42, a parasitic field Epb may develop between the red data line RDL and the blue pixel electrode 40B, whereas a parasitic field Epr may develop between the red data line RDL and the red pixel electrode 40R. If the data lines for the blue and red pixels are driven with different polarities (i.e., if the data line for the blue pixel is associated with a positive frame and has positive data line voltages such as the voltages associated with lines 94 and 96 of FIG. 10 during positive frame B, whereas the data line for the red pixel is associated with a negative frame and has negative data lines voltage such as the voltages associated with lines 94 and 96 of FIG. 10 during negative frame A), field strength disparities may develop (i.e., Epr and Epb will tend to differ). Disparities in the magnitudes of Epr and Epb can cause the liquid crystal material in the vicinity of the red and blue pixels to be influenced differently, which can lead to an undesired lack of color uniformity.

Color uniformity may be enhanced by ensuring that the pixels that straddle slits 80 have the same polarity. For example, in a configuration of the type shown in FIG. 28 in which slits 80 are interposed between red pixel electrodes 40R and blue pixel electrodes 40B, uniformity may be enhanced by ensuring that the pair of red and blue pixels that span a given slit are either both supplied with positive data lines signals (positive frame data) or are both supplied with negative data line signals (negative frame data).

Figure 28:
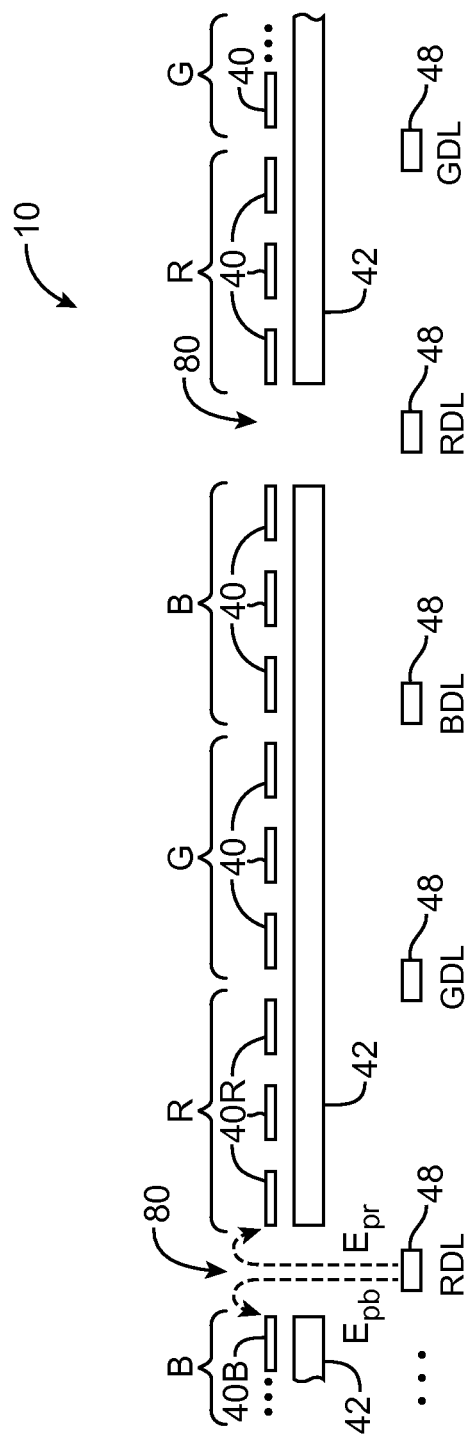
FIG. 28 is a cross-sectional side view of an illustrative display showing how a display having a ground plane with slits may be configured to position the slits between pixels such as red and blue pixels in accordance with an embodiment of the present invention.
Figure 29:
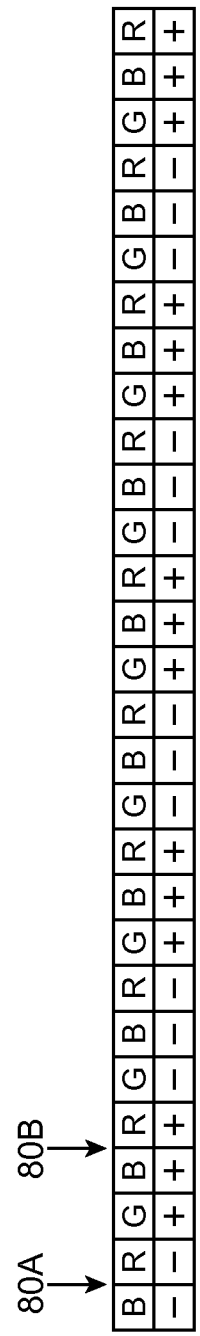
FIG. 29 is a diagram showing how data line signal polarities may be organized when driving control signals into a display of the type shown in FIG. 28 to implement a three-column inversion scheme that enhances color uniformity in accordance with an embodiment of the present invention.

An illustrative pattern that may be used for polarity of the pixels in each row of a display of the type shown in FIG. 28 is shown in FIG. 29. FIG. 29 shows the frame polarity (positive + or negative −) that is associated with each pixel color (R, B, or G). The pattern of FIG. 29 is used across all rows in display 10 (i.e., so that all red pixels in a given column are provided with a data line signal from a positive frame or all red pixels in the given column are provided with a data line signal associated with a negative frame, etc.). With a data line scheme of the type shown in FIG. 29, frame polarities in a given column will toggle back and forth between positive and negative frames over time, but at any given moment in time, the row-wise pattern of polarities will follow the layout of FIG. 29.

The slits in ground plane 42 (in the FIG. 29 example) are located between red and blue pixels, so each slit-spanning pair of adjacent red and blue will be driven using a common frame polarity. For example, the red pixel R and blue pixel B that oppose one another across slit 80A of FIG. 29 will both be provided with negative frame data while the red pixel R and blue pixel B that oppose one another across slit 80B of FIG. 29 will both be provided with positive frame data, etc. The polarities shown in FIG. 29 reverse every frame, so that each pixel may be exposed to an equal number of positive and negative frames over time to prevent movement of ionic compounds in display 10.

Circuitry 38 may produce data lines signals with a frame polarity pattern of the type shown in FIG. 29 while producing gate line signals using a top-to-bottom gate line scanning scheme or using gate line scanning schemes of the types shown in FIGS. 22-27.

Figure 30:
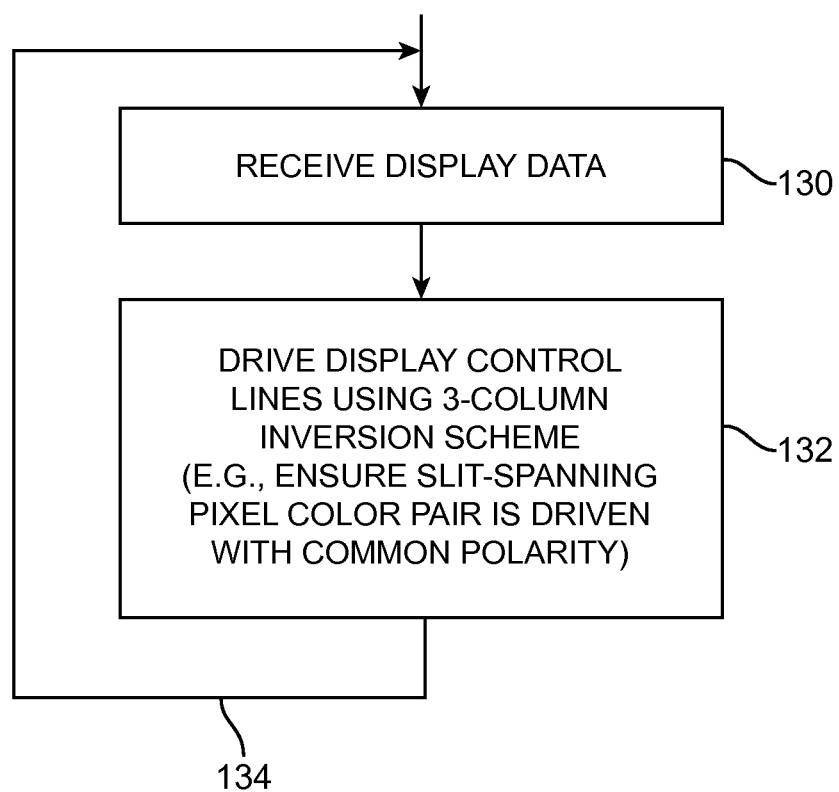
FIG. 30 is a flow chart of illustrative steps involved in operating a display of the type shown in FIG. 28 using a column inversion scheme of the type shown in FIG. 29 in accordance with an embodiment of the present invention.

A flow chart of illustrative steps that may be used in displaying image data on display 10 using a data line polarity scheme of the type shown in FIG. 29 is shown in FIG. 30. At step 130, circuitry 38 may receive data that is to be displayed on display 10. Data may be received from an integrated circuit on a logic board in device 6 (e.g., using cable 70 of FIG. 3). At step 132, circuitry 38 may drive data lines 48 using a polarity pattern of the type shown in FIG. 29, where pixels that oppose one another across a ground plane slit are driven with a common polarity (i.e., both receiving positive data line signals from respective positive frames or both receiving data line signals from respective negative frames). As the data lines are modulated to provide display 10 with desired data in each row, the gate lines in each row are asserted to turn on the transistors (transistors 50) in each row and thereby pass the data line data to appropriate electrodes 40. Line 134 shows how the operations of steps 130 and 132 may be repeated so that multiple frames of data may be driven into the pixels of display 10 over time.

Figure 31A:
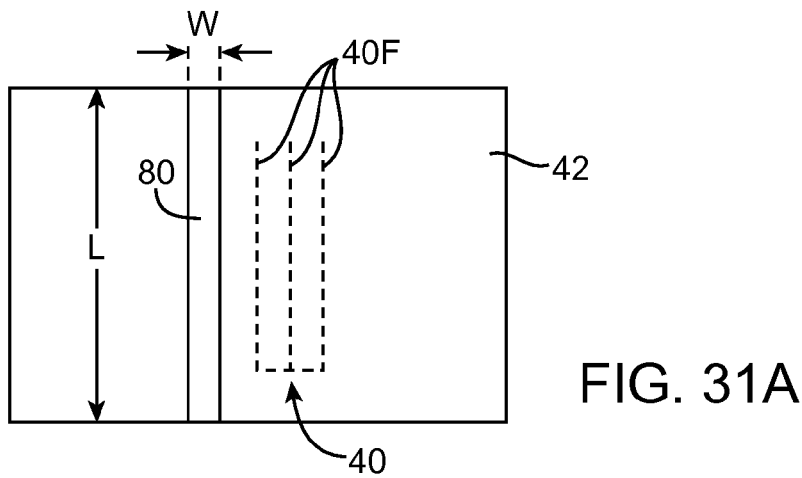
FIGS. 31A, 31B, and 31C are top views of illustrative ground plane slits that may be used in a display in accordance with an embodiment of the present invention.
Figure 31B:
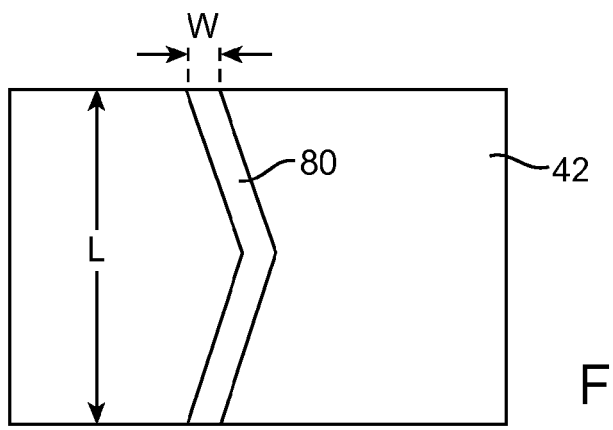
Figure 31C:
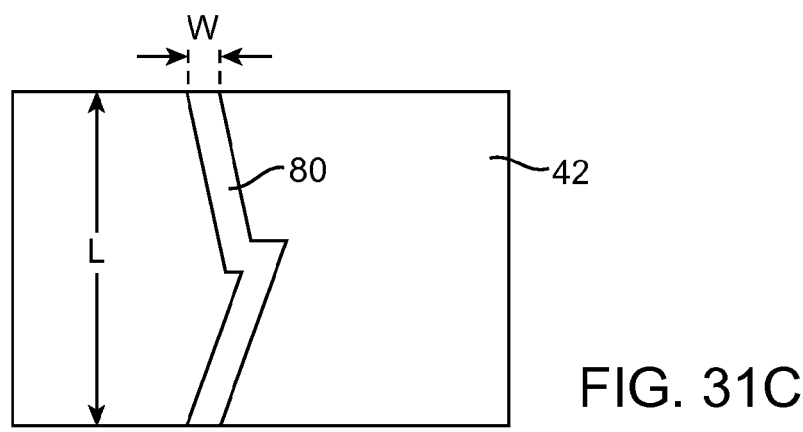

Illustrative slit shapes that may be used for slits 80 are shown in FIGS. 31A, 31B, and 31C. In the example of FIG. 31A, slit 80 has a rectangular shape. In the examples of FIGS. 31B and 31C, slit 80 has an elongated shape with straight edges and a bend. FIG. 31A shows how electrodes such as electrode 40 may include multiple parallel electrode fingers 40F (e.g., three fingers) that run parallel to slit 80. As shown in FIGS. 31A, 31B, and 31C, the width W of slit 80 is may be significantly less than its length L (e.g., W may be two or more times less than L, may be three or more time less than L, or may be four or more times less than L as examples).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of scanning gate lines in a display having a first edge, having an opposing second edge, and having rows and columns of image pixels, wherein each of the rows of image pixels is associated with a respective gate line, wherein each of the columns of image pixels is associated with a respective data line, wherein the data lines are provided with positive data line signals during positive frames and are provided with negative data line signals during negative frames, and wherein the gate lines include alternating odd and even gate lines, the method comprising:
   scanning the odd gate lines from the first edge towards the second edge and scanning the even gate lines from the second edge towards the first edge.

2. The method defined in claim 1 wherein scanning the odd gate lines from the first edge towards the second edge and scanning the even gate lines from the second edge towards the first edge comprises scanning the odd gate lines from the first edge towards the second edge and scanning the even gate lines from the second edge towards the first edge comprises in one of the positive frames, the method further comprising:
   in one of the negative frames, scanning the odd gate lines from the first edge towards the second edge and scanning the even gate lines from the second edge towards the first gate edge.

3. The method defined in claim 2 wherein scanning the odd gate lines from the first edge towards the second edge and scanning the even gate lines from the second edge towards the first edge in one of the positive frames comprises scanning the odd gate lines from the first edge towards the second edge and scanning the even gate lines from the second edge towards the first edge in a first of the positive frames, the method further comprising:
   in a second of the positive frames, scanning the odd gate lines from the second edge towards the first edge and scanning the even gate lines from the first edge towards the second edge.

4. The method defined in claim 3 wherein scanning the odd gate lines from the first edge towards the second edge and scanning the even gate lines from the second edge towards the first gate edge in one of the negative frames comprises scanning the odd gate lines from the first edge towards the second edge and scanning the even gate lines from the second edge towards the first gate edge in one of the negative frames in a first of the negative frames, the method further comprising:
   in a second of the negative frames, scanning the odd gate lines from the second edge towards the first edge and scanning the even gate lines from the first edge towards the second edge.

5. The method defined in claim 4 wherein the scanning of the odd and even gate lines comprises:
   first, scanning the odd and even gate lines in the first of the positive frames;
   second, scanning the odd and even gate lines in the first of the negative frames;
   third, scanning the odd and even gate lines in the second of the positive frames; and
   fourth, scanning the odd and even gate lines in the second of the negative frames.

6. The method defined in claim 5 wherein scanning the odd and even gate lines in each of the frames comprises simultaneously scanning the odd and even gate lines for that frame by alternating repeatedly between odd and even gate lines during gate line scanning for that frame.

7. The method defined in claim 5 wherein scanning the odd and even gate lines in each of the frames comprises:

in each of the frames, scanning all of the odd gate lines followed by all of the even gate lines.

8. The method defined in claim 1 wherein scanning the odd gate lines and the even gate lines comprises simultaneously scanning the odd gate lines and the even gate lines for a given one of the frames by alternating repeatedly between odd and even gate lines during gate line scanning for the given frame.

9. The method defined in claim 1 wherein scanning the odd gate lines and the even gate lines comprises:

in a positive frame, scanning all of the odd lines followed by all of the even lines.

10. A method comprising:

scanning gate lines in a display, wherein the gate lines include alternating odd and even gate lines and wherein scanning the gate lines comprises:

scanning the odd gate lines from a first edge of the display towards a second edge of the display; and scanning the even gate lines from the second edge of the display towards the first edge of the display.

11. The method defined in claim 10 further comprising:

as each gate line is scanned, providing data signals over a respective data line to image pixels associated with that gate line.

12. The method defined in claim 10 wherein scanning the odd and even gate lines comprises:

as part of displaying a single frame with the display, simultaneously scanning the odd and even gate lines by alternating repeatedly between odd and even gate lines.

13. The method defined in claim 10 wherein scanning the odd and even gate lines comprises:

as part of displaying a single frame with the display, scanning all of the odd gate lines followed by all of the even gate lines.

14. The method defined in claim 10 wherein the first edge is a top edge of the display and wherein the second edge is a bottom edge of the display, the method further comprising:

with the display, displaying a plurality of frames, wherein displaying each of the plurality of frames comprises:

scanning the odd gate lines from the top of the display towards the bottom of the display; and scanning the even gate lines from the bottom of the display towards the top of the display.

15. A display, comprising:

image pixels;

gate lines, each of which is associated with a respective plurality of the image pixels, wherein the gate lines include alternating odd and even gate lines;

data lines, each of which is associated with a respective plurality of the image pixels; and display driver circuitry that provides frames of data line signals to the image pixels on the data lines by scanning the odd gate lines from a first edge of the display towards a second edge of the display and scanning the even gate lines from the second edge of the display towards the first edge of the display.

16. The display defined in claim 15 wherein the image pixels are arranged in rows and columns, wherein each of the gate lines is associated with a respective row of the image pixels, and wherein each of the data lines is associated with a respective column of the image pixels.

17. The display defined in claim 15 wherein the image pixels are arranged in rows and columns, wherein each of the gate lines is associated with a respective row of the image pixels, wherein each of the data lines is associated with a respective column of the image pixels, wherein the first edge of the display comprises a top edge of the display, and wherein the second edge of the display comprises a bottom edge of the display.

18. The display defined in claim 15 wherein the image pixels are arranged in rows and columns, wherein each of the gate lines is associated with a respective row of the image pixels, wherein each of the data lines is associated with a respective column of the image pixels, and wherein the display driver circuitry, as part of providing a single frame of data line signals to the image pixels, simultaneously scans the odd and even gate lines by alternating repeatedly between odd and even gate lines.

19. The display defined in claim 15 wherein the image pixels are arranged in rows and columns, wherein each of the gate lines is associated with a respective row of the image pixels, wherein each of the data lines is associated with a respective column of the image pixels, and wherein the display driver circuitry, as part of providing a single frame of data line signals to the image pixels, scans all of the odd gate lines and then scans all of the even gate lines.

20. The display defined in claim 15 wherein the display comprises a liquid crystal display.

* * * * *